US011367230B2

(12) United States Patent
Hoover et al.

(10) Patent No.: US 11,367,230 B2
(45) Date of Patent: *Jun. 21, 2022

(54) VIRTUAL RETICLE FOR AUGMENTED REALITY SYSTEMS

(71) Applicant: Magic Leap, Inc., Plantation, FL (US)

(72) Inventors: Paul Armistead Hoover, Bothell, WA (US); Sam Baker, Seattle, WA (US); Jennifer M. R. Devine, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,077

(22) Filed: Oct. 5, 2020

(65) Prior Publication Data

US 2021/0090311 A1    Mar. 25, 2021

Related U.S. Application Data

(63) Continuation of application No. 16/170,407, filed on Oct. 25, 2018, now Pat. No. 10,839,576.

(Continued)

(51) Int. Cl.
*G06T 19/00*    (2011.01)
*G06F 3/0481*   (2022.01)
(Continued)

(52) U.S. Cl.
CPC ............ *G06T 11/60* (2013.01); *G02B 27/017* (2013.01); *G06F 3/005* (2013.01); *G06F 3/011* (2013.01);
(Continued)

(58) Field of Classification Search
CPC ........ G06T 19/006; G06F 3/005; G06F 3/011; G06F 3/012; G06F 3/04812; G06F 3/04815; G06K 9/0061; G06K 9/00671
See application file for complete search history.

(56) References Cited

U.S. PATENT DOCUMENTS 6,850,221 B1   2/2005   Tickle
D514,570 S     2/2006   Ohta
(Continued)

FOREIGN PATENT DOCUMENTS

| CA | 2 248 473      | 7/2000 |
| FR | 3003049 A1     | 9/2014 |
| WO | WO 2019/084325 | 5/2019 |

OTHER PUBLICATIONS

International Search Report and Written Opinion, re PCT Application No. PCT/US18/57593, dated Jan. 11, 2019.

(Continued)

*Primary Examiner* — Diane M Wills
(74) *Attorney, Agent, or Firm* — Knobbe, Martens, Olson & Bear, LLP

(57) ABSTRACT

Systems and methods for displaying a virtual reticle in an augmented or virtual reality environment by a wearable device are described. The environment can include real or virtual objects that may be interacted with by the user through a variety of poses, such as, e.g., head pose, eye pose or gaze, or body pose. The user may select objects by pointing the virtual reticle toward a target object by changing pose or gaze. The wearable device can recognize that an orientation of a user's head or eyes is outside of a range of acceptable or comfortable head or eye poses and accelerate the movement of the reticle away from a default position and toward a position in the direction of the user's head or eye movement, which can reduce the amount of movement by the user to align the reticle and target.

17 Claims, 20 Drawing Sheets

Related U.S. Application Data

(60) Provisional application No. 62/578,094, filed on Oct. 27, 2017.

(51) Int. Cl.

| | | |
|---|---|---|
| *G06F 3/01* | (2006.01) | |
| *G06F 3/12* | (2006.01) | |
| *G06T 11/60* | (2006.01) | |
| *G02B 27/01* | (2006.01) | |
| *G06F 3/00* | (2006.01) | |
| *G06F 3/04812* | (2022.01) | |
| *G06F 3/04815* | (2022.01) | |
| *G06V 20/20* | (2022.01) | |
| *G06V 40/18* | (2022.01) | |

(52) U.S. Cl.
CPC ............ *G06F 3/012* (2013.01); *G06F 3/013* (2013.01); *G06F 3/017* (2013.01); *G06F 3/04812* (2013.01); *G06F 3/04815* (2013.01); *G06T 19/006* (2013.01); *G06V 20/20* (2022.01); *G06V 40/193* (2022.01)

(56) References Cited

U.S. PATENT DOCUMENTS

| | | |
|---|---|---|
| 9,081,426 B2 | 7/2015 | Armstrong |
| 9,134,793 B2 | 9/2015 | McDonald et al. |
| 9,215,293 B2 | 12/2015 | Miller |
| D752,529 S | 3/2016 | Loretan et al. |
| 9,348,143 B2 | 5/2016 | Gao et al. |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch et al. |
| 9,874,749 B2 | 1/2018 | Bradski |
| 10,839,576 B2 | 11/2020 | Hoover et al. |
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0191964 A1* | 7/2014 | McDonald .............. G06F 3/011 345/158 |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0220142 A1 | 8/2015 | Parkinson et al. |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0034032 A1 | 2/2016 | Jeong |
| 2016/0070966 A1 | 3/2016 | Yang et al. |
| 2017/0053450 A1 | 2/2017 | Rodriguez et al. |
| 2017/0171539 A1 | 6/2017 | Inomata |
| 2019/0096136 A1* | 3/2019 | Yuan .................. G02B 27/0093 |
| 2019/0130622 A1 | 5/2019 | Hoover et al. |
| 2020/0184729 A1* | 6/2020 | Jones .................... G06F 3/0346 |

OTHER PUBLICATIONS

International Preliminary Report for Patentability, re PCT Application No. PCT/US18/57593, dated Apr. 28, 2020.

Steinicke, et al., "Analysis of Human Sensitivity to Redirected Walking," Proceedings of the 2008 ACM Symposium on Virtual Reality Softwaare and Technology, ACM 2008.

ARToolKit: https://web.archive.org/web/20051013062315/http://www.hitl.washington.edu:80/artoolkit/documentation/hardware.htm, archived Oct. 13, 2005.

Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

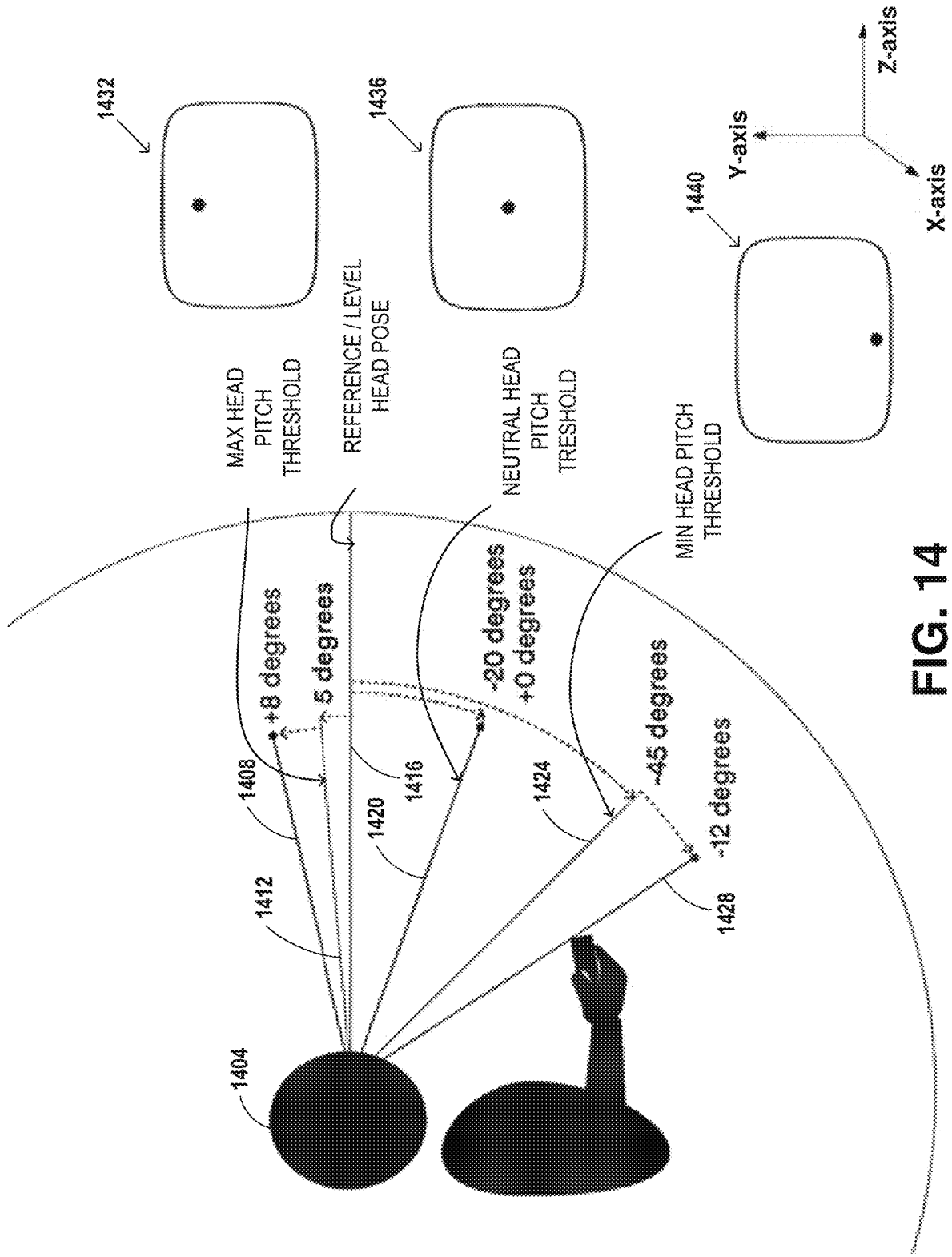

US 11,367,230 B2

VIRTUAL RETICLE FOR AUGMENTED REALITY SYSTEMS

RELATED APPLICATIONS

This application is a continuation of U.S. application Ser. No. 16/170,407, filed Oct. 25, 2018, entitled "VIRTUAL RETICLE FOR AUGMENTED REALITY SYSTEMS," which claims priority to U.S. Provisional Patent Application No. 62/578,094, filed Oct. 27, 2017, entitled "VIRTUAL RETICLE FOR AUGMENTED REALITY SYSTEMS," each of which is hereby incorporated by reference herein in its entirety.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present disclosure relates to virtual reality and augmented reality imaging and visualization systems and more particularly to displaying a virtual reticle based on head pose.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Various embodiments of systems and methods for displaying a virtual reticle are disclosed. An environment can include real or virtual objects that may be interacted with by a user using a virtual reticle. The position or orientation of the user's head, eyes, shoulders, chest, arms or other body parts can dictate the position or speed-of-movement of the virtual reticle within the environment, and the user may select or point to an object by directing the virtual reticle toward or focusing the reticle on a target object. The wearable device can recognize that the user's head, eye(s), shoulders, chest, arm(s) or the like are positioned or orientated uncomfortably or otherwise undesirably. Responsive to the recognition of the uncomfortable or undesirable pose, the system can adjust a position or speed-of-movement of the virtual reticle to aid in desirably positioning the virtual reticle, thereby decreasing a likelihood that the user's pose remains uncomfortable or undesirable.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 14 illustrates examples of adjusting position of a reticle based on the user's head pose.

Figure 1:
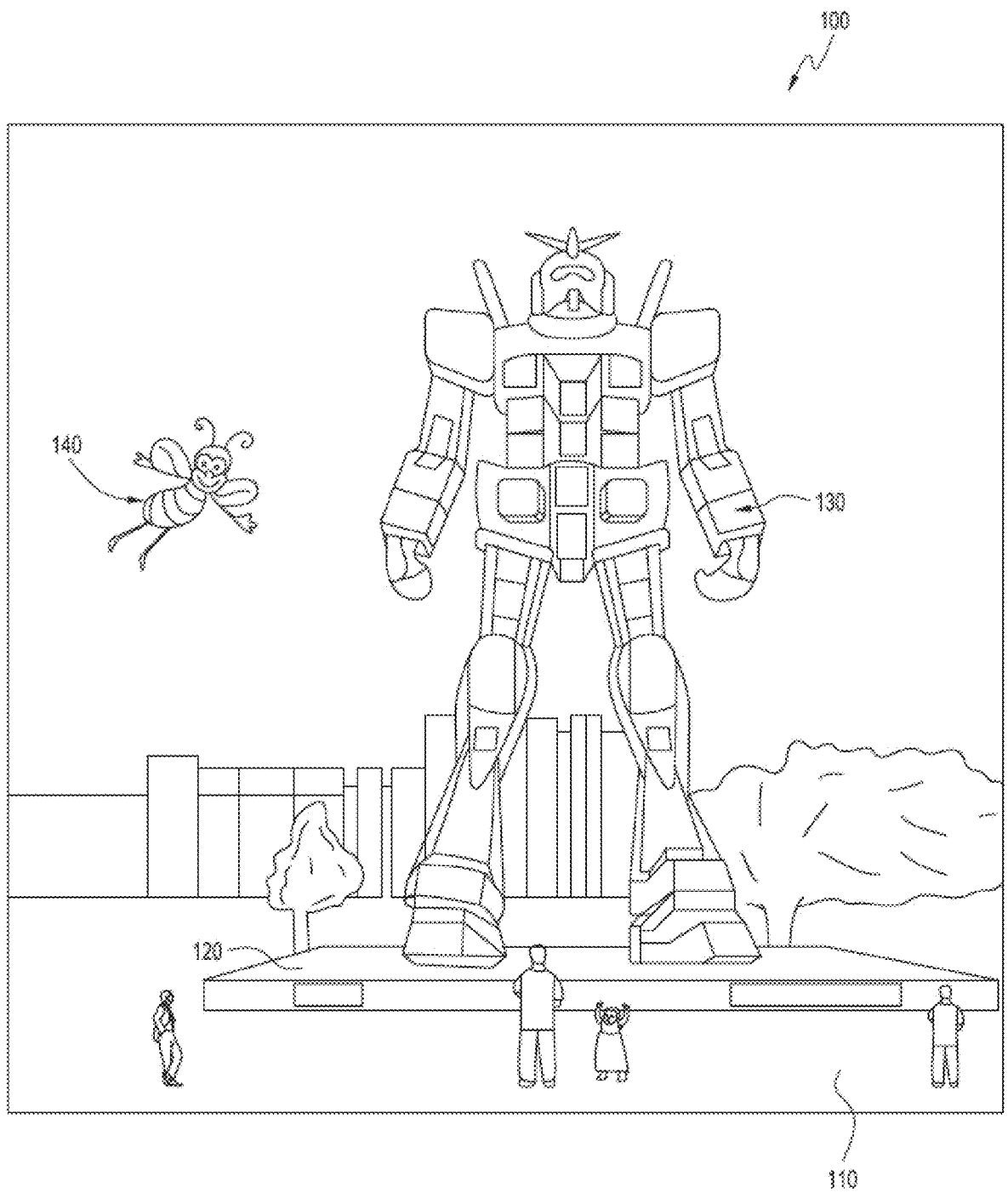
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure. Additionally, the figures in the present disclosure are for illustration purposes and are not to scale.

DETAILED DESCRIPTION

Overview

A wearable device can include a display for presenting an interactive VR/AR/MR environment. The VR/AR/MR environment can include data elements that may be interacted with by the user through a variety of poses, such as, e.g., head pose, eye gaze, or body pose. The VR/AR/MR environment may include a reticle that corresponds to the user's current position with respect to the user's field of view (e.g., the extent of the VR/AR/MR environment that is seen at any given moment). For example, the reticle may represent the user's direction of gaze. When the user moves around (e.g., by moving eyes, head, body, or any combination thereof), the reticle may also move with the user. The reticle may point at one or more objects, and the user may select a target object to which the reticle is pointing. For example, the user may move his or her head to point the reticle to an object to be selected and then click a hand-held user input totem to select the object. The wearable display device can perform an appropriate action on the selected object (e.g., move the object, highlight or enlarge the object, call up information about the object, display a menu of actions that can be performed that are associated with the object, etc.).

At times, the user may desire to reorient his or her head (non-limiting example: to select an object that is high in the environment (e.g., the ceiling), low to the ground (e.g., the floor or the user's feet), far to the right, far to the left, etc.), which may require the user to bend, twist or crane his or her neck such that the reticle is positioned at the desired object. The bending, twisting, and/or craning of the user's neck can result in, among other things, neck strain or discomfort during use of the wearable device. Accordingly, the wearable system can recognize that an orientation of a user's head is outside of a range of acceptable (e.g., comfortable, non-straining, etc.) head poses. As a result, to assist the user in moving or adjusting the reticle, the wearable system may modify or accelerate the movement (e.g., modify an angle) of the reticle in a direction corresponding to a direction to which the user's head is moving. By modifying or accelerating the movement of the reticle, the wearable system advantageously reduces a degree to which the user must bend, twist or crane his or her neck to align the reticle and target object, thereby reducing a likelihood of neck strain or discomfort.

As an example, if the user looks upward toward an object near the ceiling, the wearable display device may move the reticle from a default reticle position (non-limiting example: near the center of the field of view (FOV) of the display) to another position, such as toward the top of the user's FOV. Likewise, if the user looks downward, the wearable display device may move the reticle from a default position in the FOV to another position, such as near the bottom of the user's FOV. The wearable display device may similarly reposition the reticle if the user looks rightward or leftward (e.g., moving the reticle to the right side or left side, respectively, of the FOV), diagonally up to the right or left, diagonally down to the right or left, etc. The default reticle position is not limited to the center of the FOV. Rather, any location within the FOV can be utilized as the default reticle position.

The user may desire to use his or her eyes to adjust the reticle. The wearable device can collect eye data such as eye images (e.g., via an eye camera in an inward-facing imaging system of the wearable device). The wearable system can calculate the user's eye gaze direction based on a mapping matrix that provides an association between the user's eye gaze and a gaze vector (which can indicate the user's direction of gaze). As the user's eyes moves, the wearable system can determine the user's eye gaze direction and the user's field of view or the reticle may move in response to changes in the eye gaze direction. If the user desires to view or target an object that is high, low, far left, far right, and so on using changes in eye gaze rather than or in addition to changes to head pose, the movement of the user's eyes and/or the fixation of the eyes at a particular location can result in, among other things, eye strain, discomfort, or headaches. Accordingly, the wearable system can recognize that an orientation of a user's eye is outside of a range of acceptable (e.g., comfortable, non-straining, etc.) eye poses. As a result, to assist the user in moving or adjusting the reticle, the wearable system may accelerate the movement (e.g., modify an angle) of the reticle in a direction corresponding to a direction to which the user's eyes are moving. By accelerating the movement of the reticle, the wearable system advantageously reduces a likelihood of eyestrain, headaches, eye discomfort and the like.

By providing a process in which the user can align the virtual reticle with a target using a combination of head pose or eye gaze, the wearable system can provide an intuitive process by which the user can more readily make the alignment while reducing or minimizing neck strain or eye strain.

Examples of 3D Display of a Wearable System

A wearable system (also referred to herein as an augmented reality (AR) system) can be configured to present two-dimensional (2D) or three-dimensional (3D) virtual images to a user. The images may be still images, frames of a video, or a video, in combination or the like. The wearable system can include a wearable device that can present a VR, AR, or MR environment, alone or in combination, for user interaction. The wearable device can be a head-mounted device (HMD) which is used interchangeably as an AR device (ARD).

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
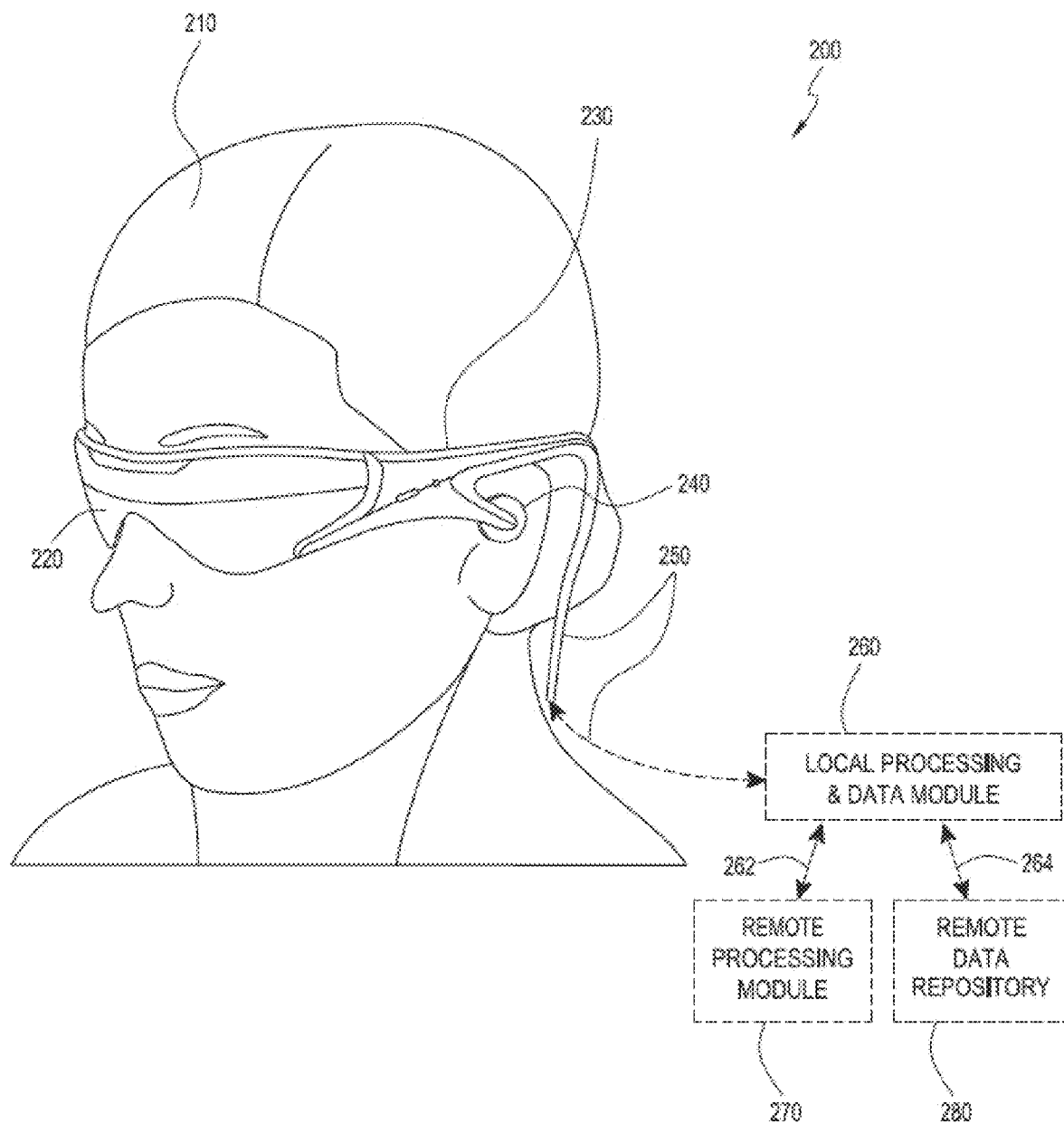
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control).

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video, in combination or the like.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), microphones, inertial measurement units (IMUs) (e.g., accelerometers, gravitometers, magnetometers, etc.), compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data and/or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
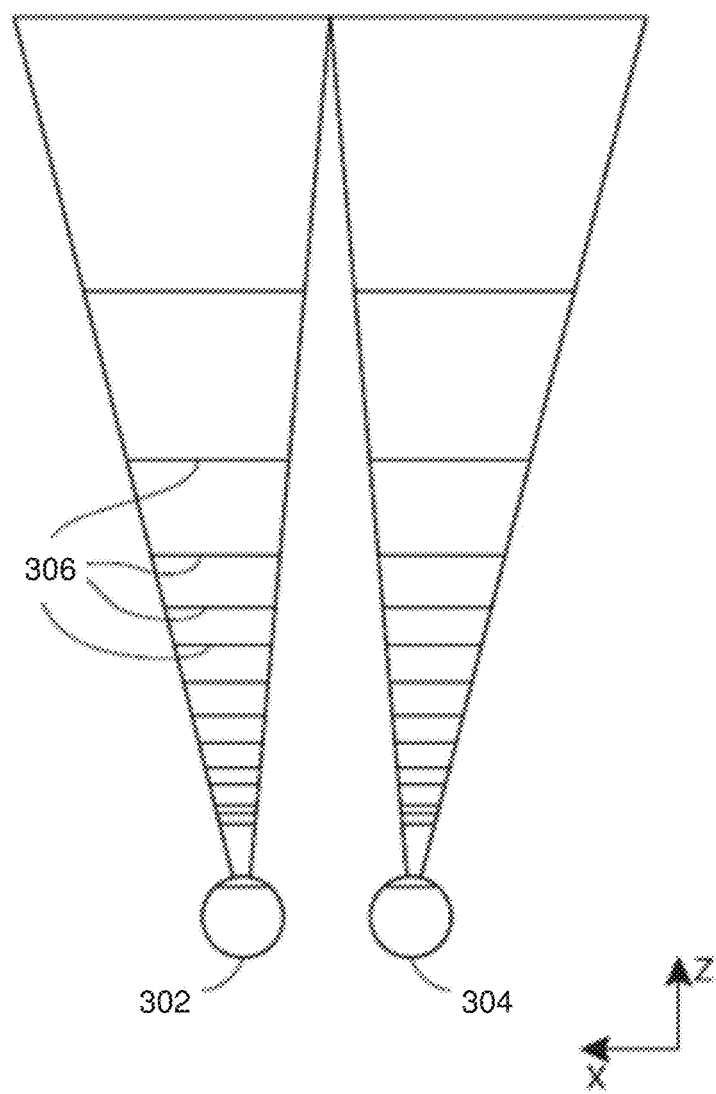
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
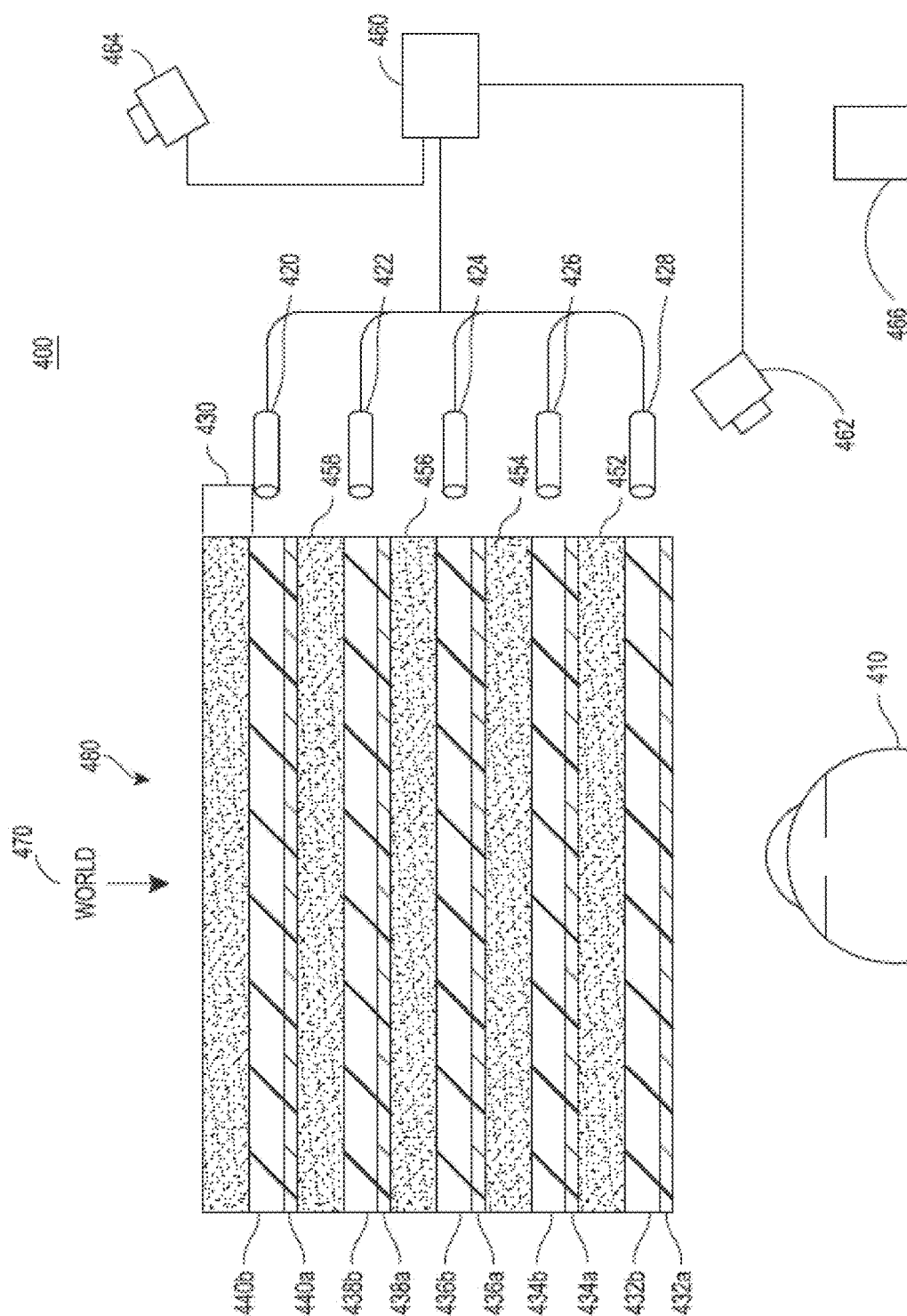
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include $4\pi$ steradians of solid angle surrounding the wearable system 400 because the wearer can move his or her body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using one or more head pose sensors such as an, (which may comprise an accelerometer, a gyroscope, or a magnetometer), etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
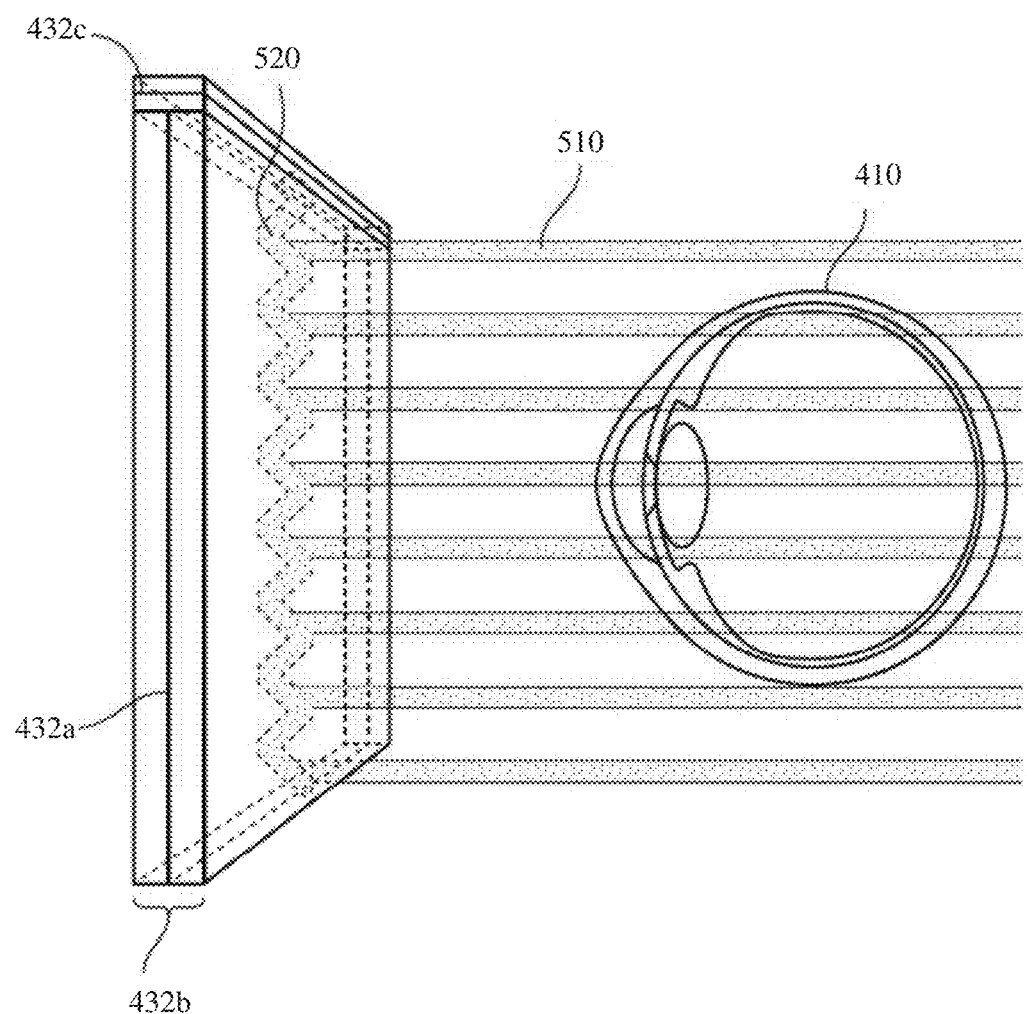
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
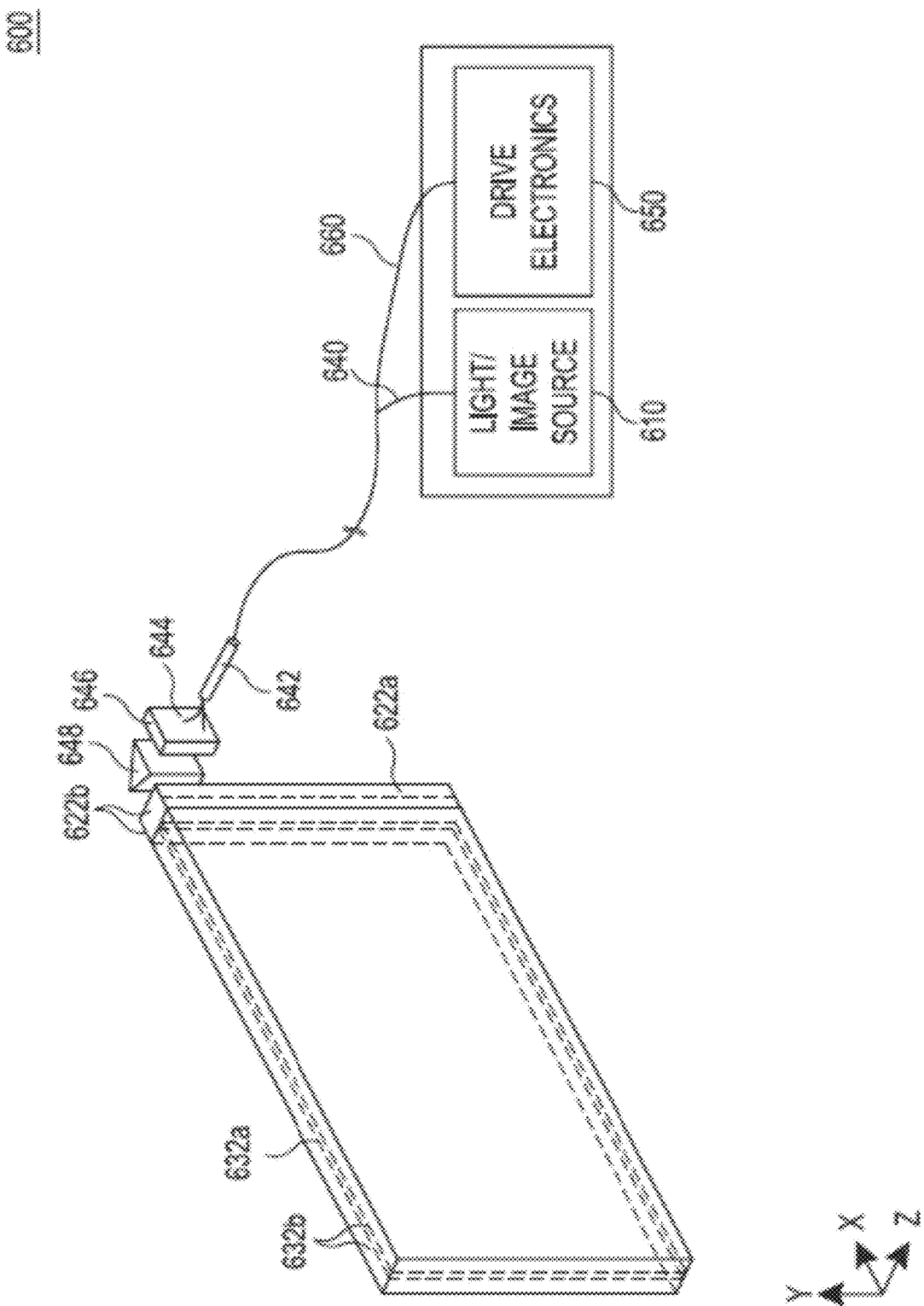
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 4 in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or alternatively to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
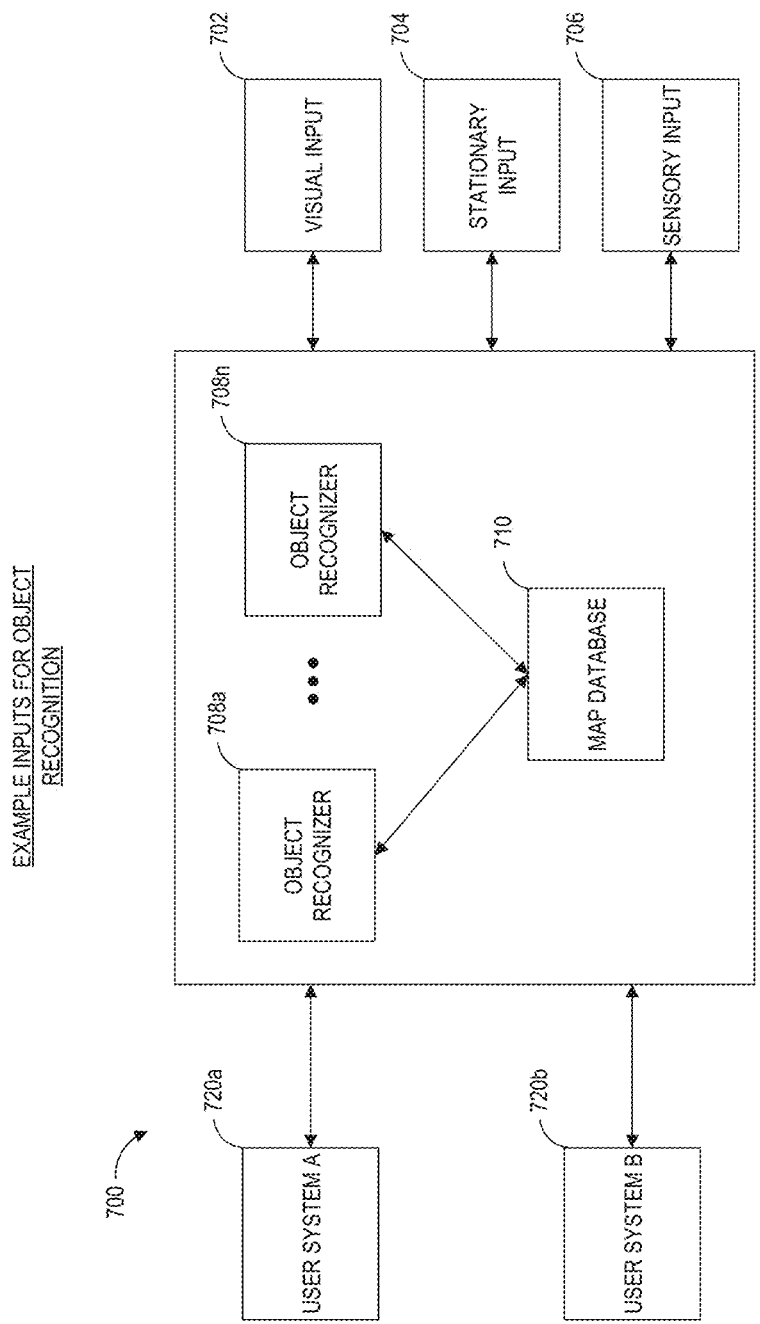
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, other objects in the user's environment, etc. One or more object recognizers may be specialized for object with certain characteristics. For example, the object recognizer 708a may be used to recognizer faces, while another object recognizer may be used recognize totems.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

In some embodiments, the object recognitions can be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time, the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
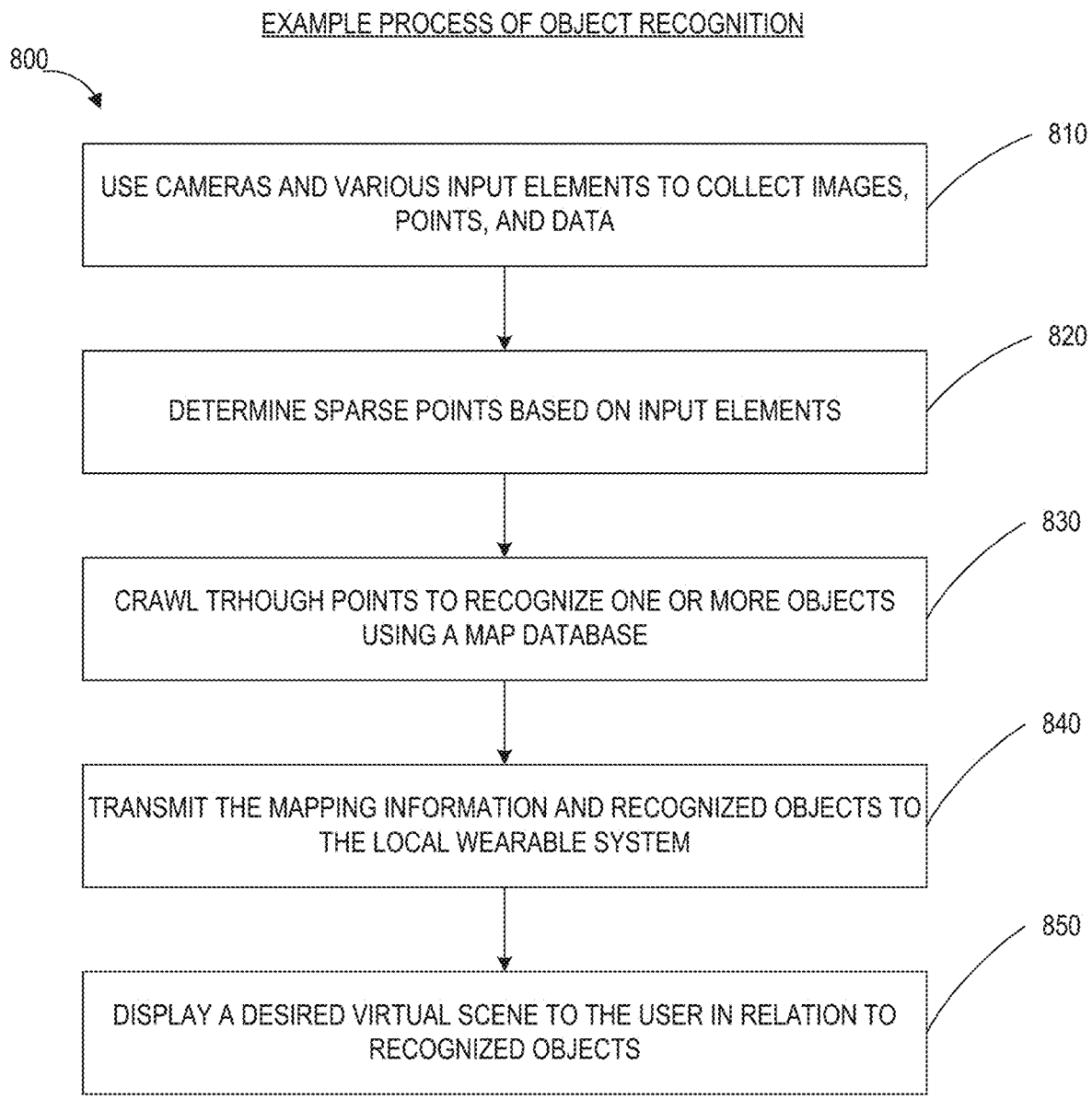
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be represented to a user of the wearable system. The user may be geographically remote from the scene. For example, the user may be New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block

840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
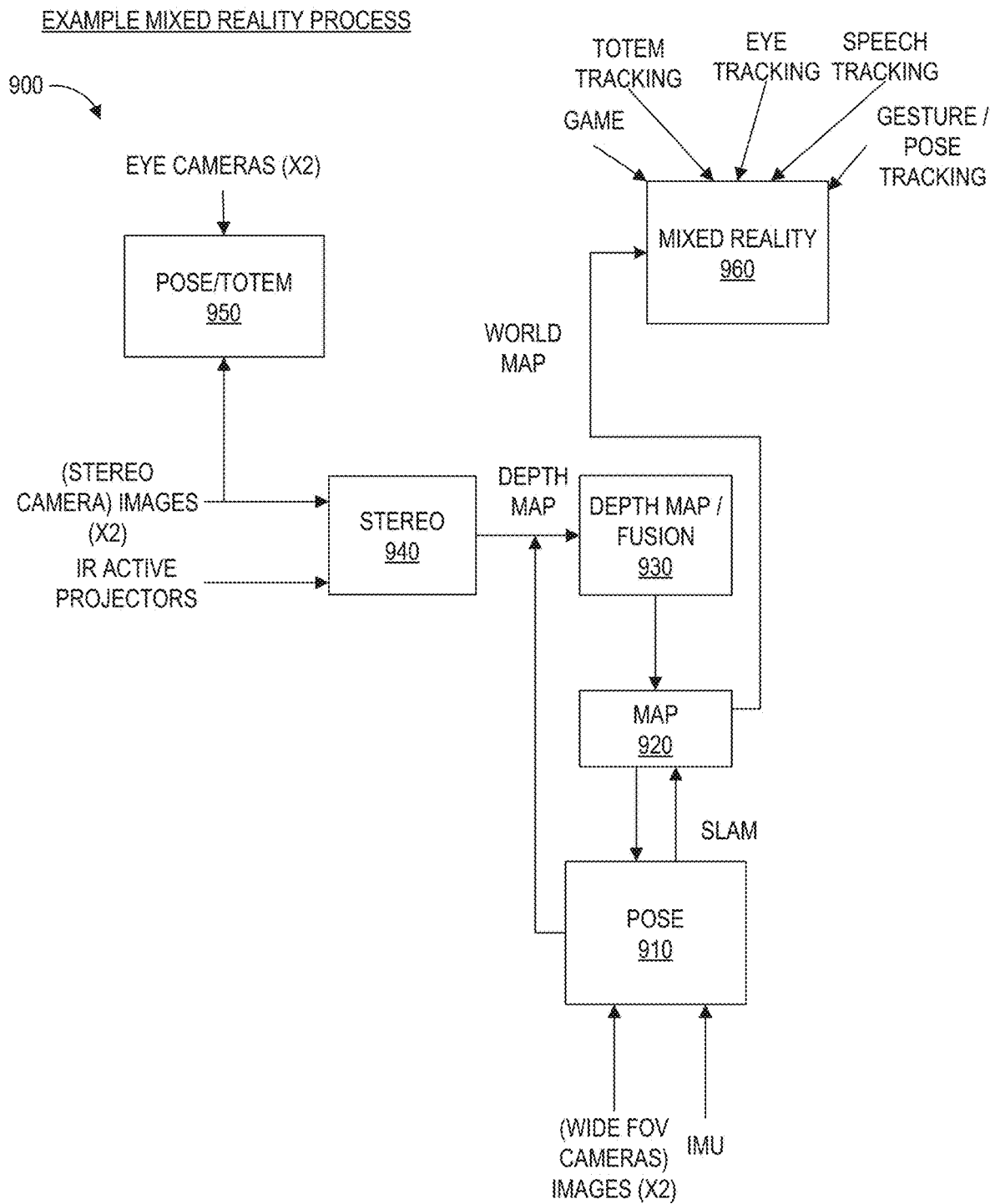
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected real-time as the user is experiencing the system and operating in the world. The data may comprise images, data from sensors (such as inertial measurement units (IMUs), which may comprise an accelerometer, a gyroscope, a magnetometer, or combinations of such components) and surface information pertinent to objects in the real or virtual environment.

A sparse point representation may be the output of a simultaneous localization and mapping (SLAM or V-SLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
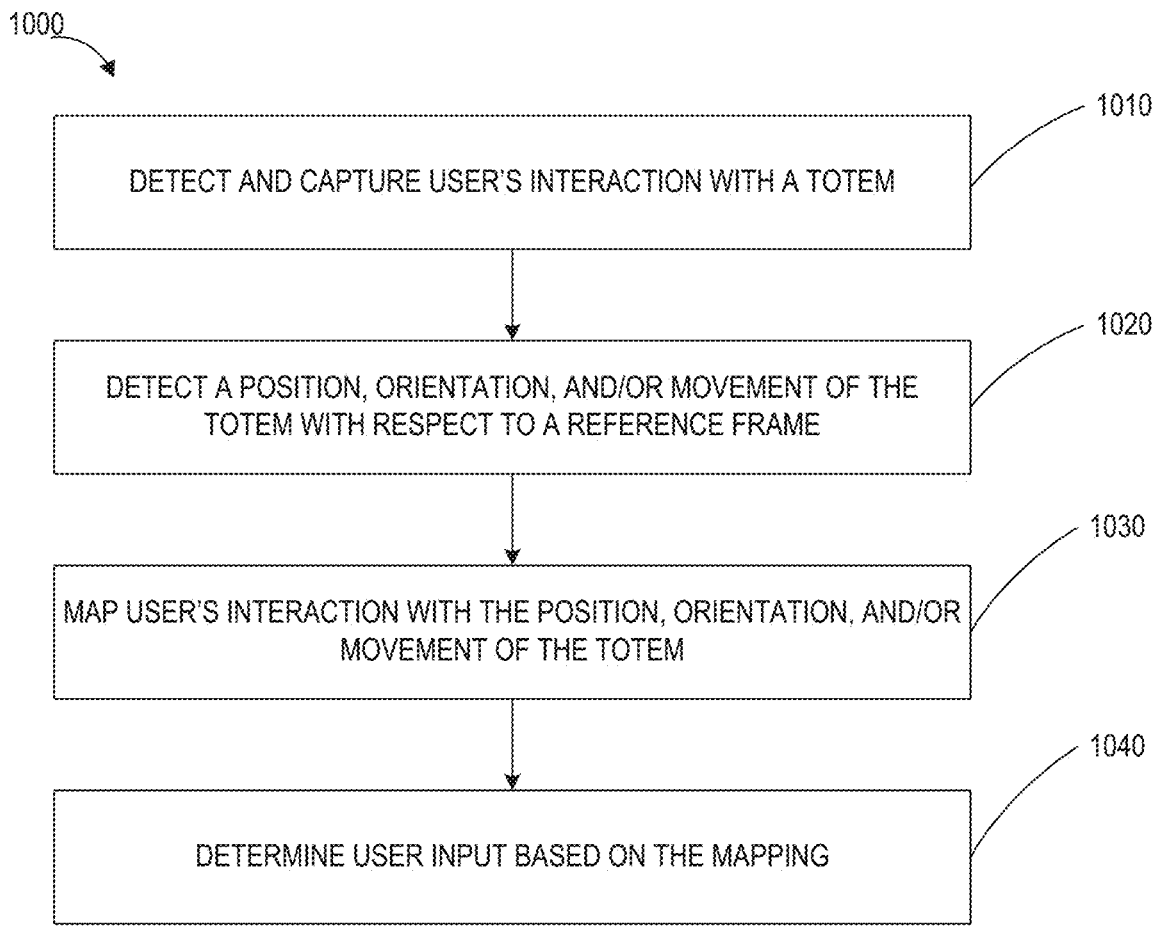
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward facing system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray-casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
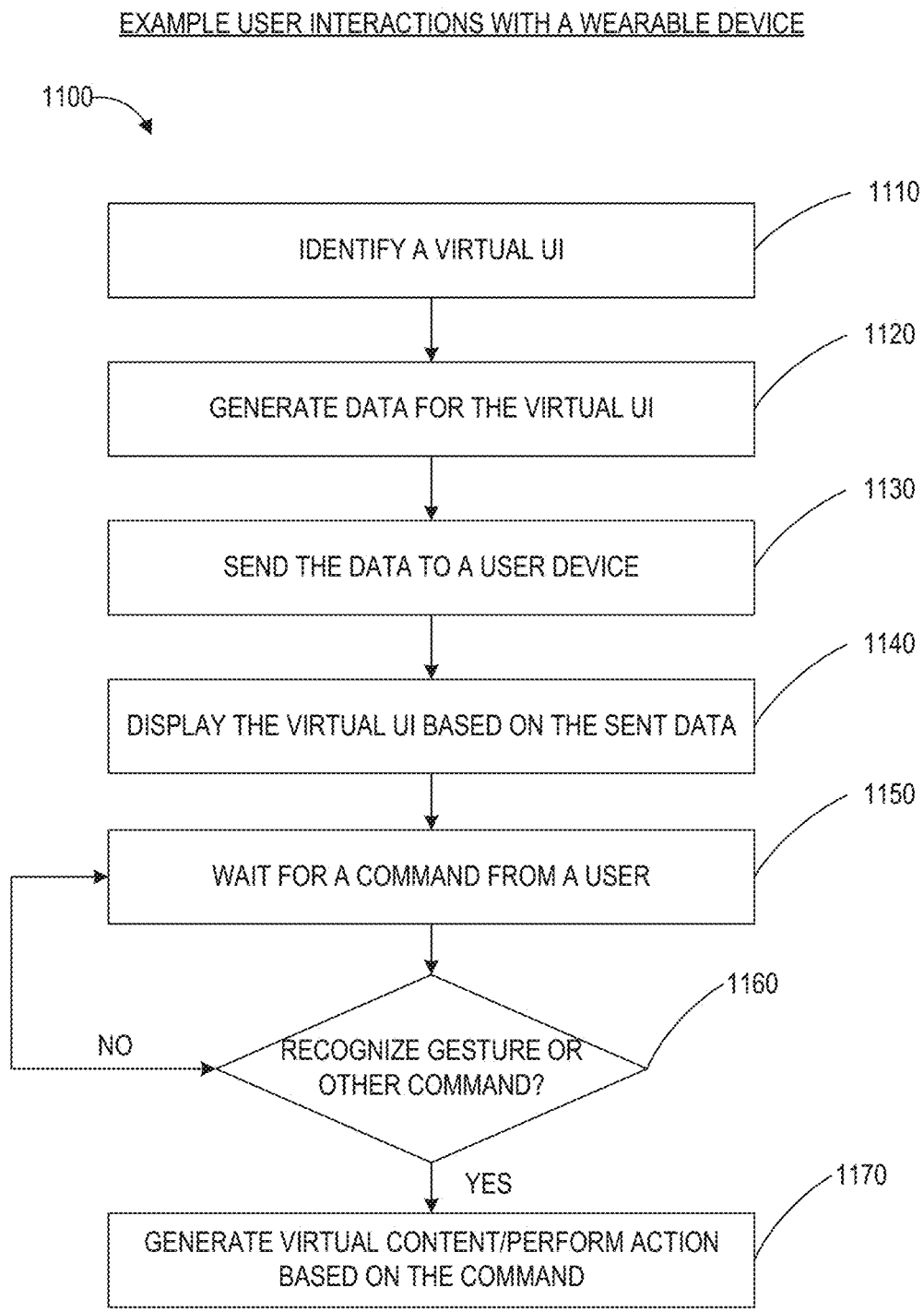
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170). As an example, the wearable system may wait for user's hand gestures before mixing multiple steam tracks.

Additional examples of wearable systems, UIs, and user experiences (UX) are described in U.S. Patent Publication No. 2015/0016777, which is incorporated by reference herein in its entirety.

Example Objects in the Field of Regard (FOR) and Field of View (FOV)

Figure 12A:
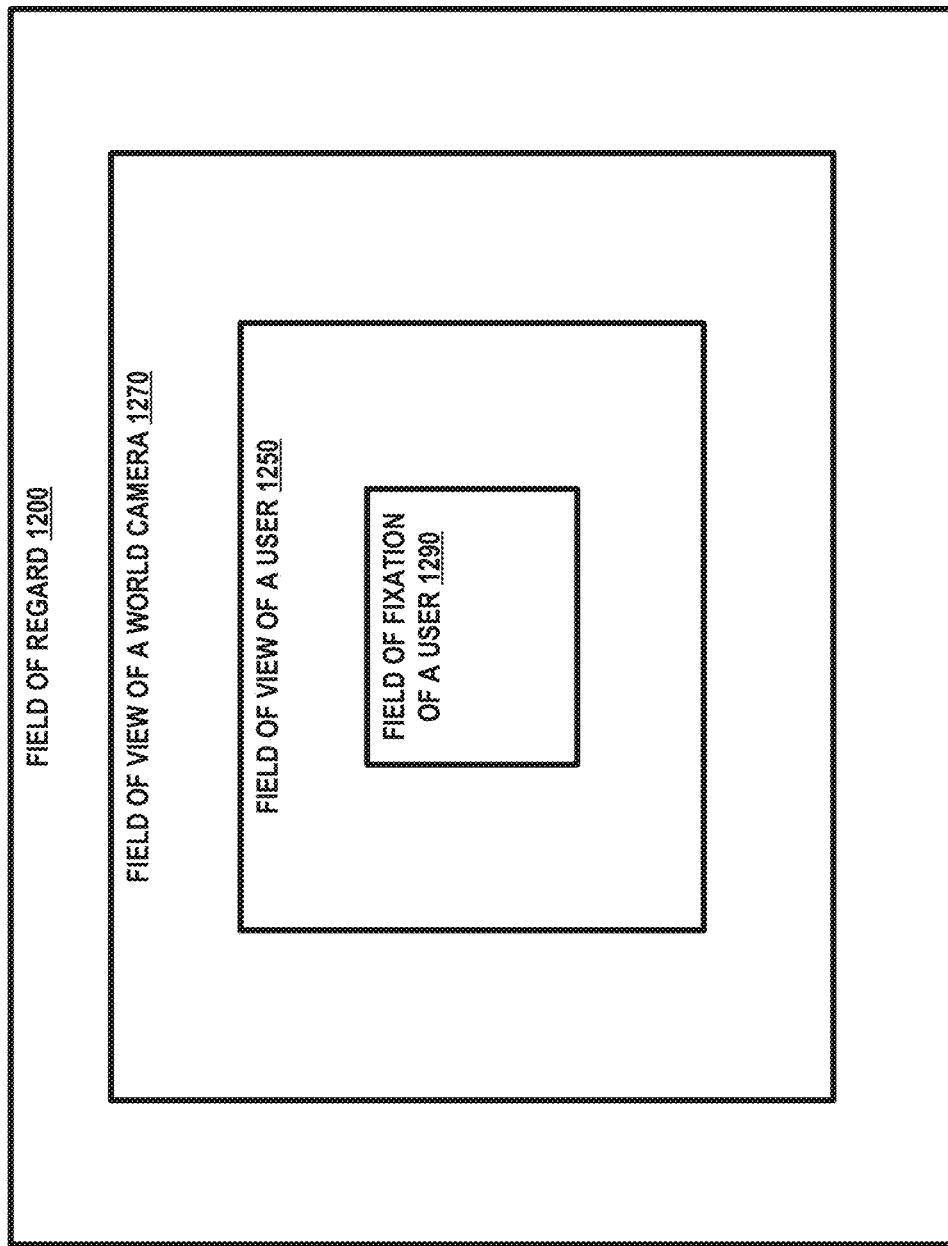
FIG. 12A schematically illustrates an example of a field of regard (FOR), a field of view (FOV) of a world camera, a field of view of a user, and a field of fixation of a user.

FIG. 12A schematically illustrates an example of a field of regard (FOR) 1200, a field of view (FOV) of a world camera 1270, a field of view of a user 1250, and a field of fixation of a user 1290. As described with reference to FIG. 4, the FOR 1200 comprises a portion of the environment around the user that is capable of being perceived by the user via the wearable system. The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle.

The field of view of a world camera 1270 can include a portion of the user's FOR that is currently observed by an outward-facing imaging system 464. With reference to FIG. 4, the field of view of a world camera 1270 may include the world 470 that is observed by the wearable system 400 at a given time. The size of the FOV of the world camera 1270 may depend on the optical characteristics of the outward-facing imaging system 464. For example, the outward-facing imaging system 464 can include a wide angle camera that can image a 190 degree space around the user. In certain implementations, the FOV of the world camera 1270 may be larger than or equal to a natural FOV of a user's eyes.

The FOV of a user 1250 can include the portion of the FOR 1200 that a user perceives at a given time. The FOV can depend on the size or optical characteristics of the display of a wearable device. For example, an AR display may include optics that only provides AR functionality when the user looks through a particular portion of the display. The FOV 1250 may correspond to the solid angle that is perceivable by the user when looking through an AR display such as, e.g., the stacked waveguide assembly 480 (FIG. 4) or the planar waveguide 600 (FIG. 6). In certain embodiments, the FOV of a user 1250 may be smaller than the natural FOV of the user's eyes.

The wearable system can also determine a user's field of fixation (FOF) 1290. The FOF 1290 can include a portion of the FOV 1250 at which the user's eyes can fixate (e.g., maintain visual gaze at that portion). The FOF 1290 can be smaller than the FOV 1250 of a user, for example, the FOF may be a few degrees to about 5 degrees across. As a result, the user can perceive some virtual objects in the FOV 1250 that are not in the field of fixation 1290 but which are in a peripheral FOV of the user.

Figure 12B:
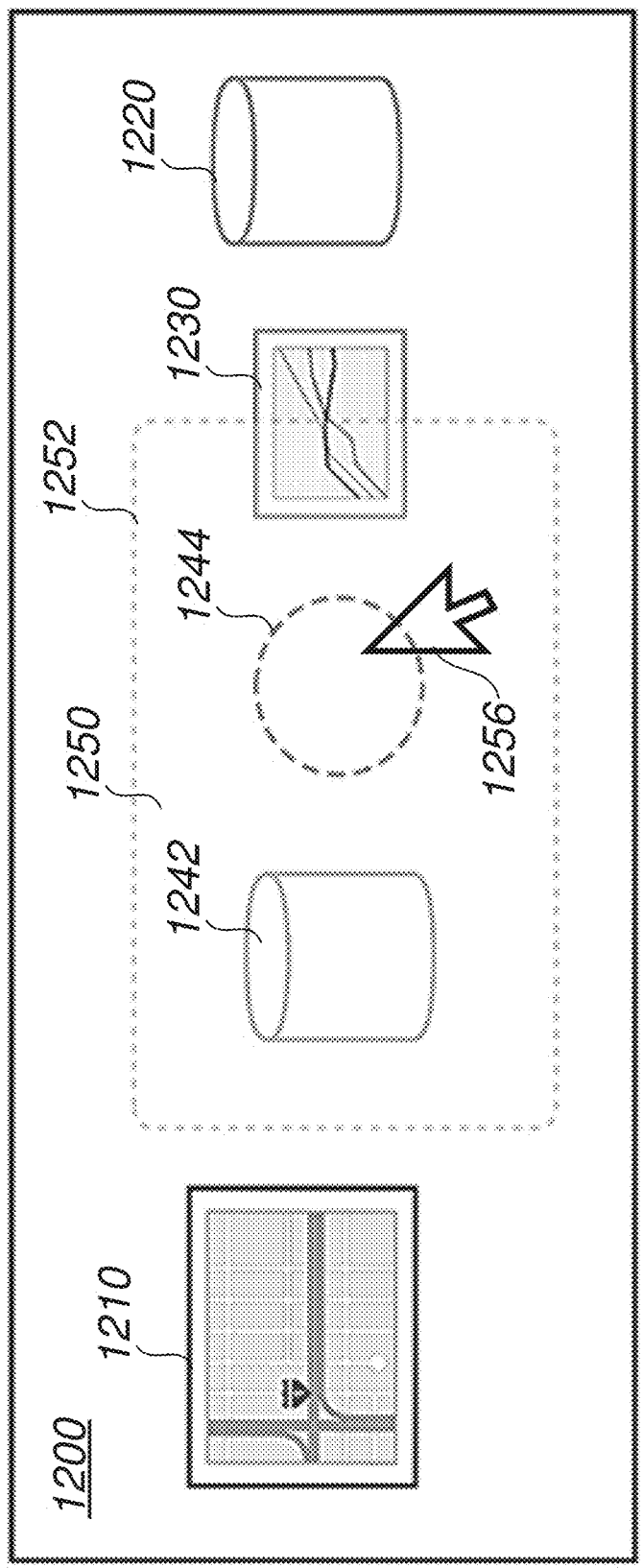
FIG. 12B schematically illustrates an example of virtual objects in a user's field of view and virtual objects in a field of regard.

FIG. 12B schematically illustrates an example of virtual objects in a user's FOV 1250 and virtual objects in a FOR 1200. In FIG. 12B, the FOR 1200 can include a group of objects (e.g. 1210, 1220, 1230, 1242, and 1244) which can be perceived by the user via the wearable system. The objects within the FOR 1200 may be virtual and/or physical objects. For example, the FOR 1200 may include physical object such as a chair, a sofa, a wall, etc. The virtual objects may include operating system objects such as e.g., a recycle bin for deleted files, a terminal for inputting commands, a file manager for accessing files or directories, an icon, a menu, an application for audio or video streaming, a notification from an operating system, and so on. The virtual objects may also include objects in an application such as e.g., avatars, virtual objects in games, graphics or images, etc. Some virtual objects can be both an operating system object and an object in an application. In some embodiments, the wearable system can add virtual elements to the existing physical objects. For example, the wearable system may add a virtual menu associated with a television in the room, where the virtual menu may give the user the option to turn on or change the channels of the television using the wearable system.

A virtual object may be a three-dimensional (3D), two-dimensional (2D), or one-dimensional (1D) object. For example, the virtual object may be a 3D coffee mug (which may represent a virtual control for a physical coffee maker). The virtual object may also be a 2D graphical representation of a clock (displaying current time to the user). In some implementations, one or more virtual objects may be displayed within (or associated with) another virtual object. A virtual coffee mug may be shown inside of a user interface plane, although the virtual coffee mug appears to be 3D within this 2D planar virtual space.

The objects in the user's FOR can be part of a world map as described with reference to FIG. 9. Data associated with objects (e.g. location, semantic information, properties, etc.) can be stored in a variety of data structures such as, e.g., arrays, lists, trees, hashes, graphs, and so on. The index of each stored object, wherein applicable, may be determined, for example, by the location of the object. For example, the data structure may index the objects by a single coordinate such as the object's distance from a fiducial position (e.g., how far to the left or right of the fiducial position, how far from the top or bottom of the fiducial position, or how far depth-wise from the fiducial position). The fiducial position may be determined based on the user's position (such as the position of the user's head or eyes). The fiducial position may also be determined based on the position of a virtual or physical object (such as a target object) in the user's environment. That way, the 3D space in the user's environment may be collapsed into a 2D user interface where the virtual objects are arranged in accordance with the object's distance from the fiducial position.

Utilization of a Reticle

With continued reference to FIG. 12B, the VR/AR/MR system can display a virtual reticle 1256 which may include a movable indicator identifying a position of a user within the FOV 1250. For example, the reticle 1256 may represent a direction of gaze of a user such as a field of fixation, a point that will be affected by input from the user, or the like. The appearance of a reticle 1256 can take on any of a variety of different colors, outlines, shapes, symbols, sizes, images, graphics, in combination or the like. For example, the reticle 1256 may take a variety of shapes such as a cursor, a geometric cone, a narrow beam, an arrow, an oval, a circle, a bullseye, a polygon, or other 1D, 2D, or 3D shapes. The reticle 1256 may be a virtual object that is fixed within a rig space (e.g., a coordinate system associated with the wearable device such as a Cartesian x-y-z coordinate system), but also may be capable of being fixed within the user's 3D environment. The reticle 1256 may be represented by a virtual object that the user can drag and drop (e.g., from a position in a rig space) to a specific position within the user's 3D space.

A user can move his or her body, head, or eyes to move the reticle 1256. For example, a change in the user's pose (e.g., head pose, body pose, or eye gaze) may alter the location of the reticle 1256 within FOV 1250 and/or alter what is shown or observable in the FOV 1250. Similarly, the reticle 1256 may be controlled though a user input device such as a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. For example, as the user moves his hand on a user input device, the reticle 1256 may move from a first position to a second position.

The reticle 1256 may be used to select, view, or point to an object, such as one of objects 1210, 1242, 1244, 1230, 1220, by moving the reticle 1256 such that it hovers over or otherwise points to the target object. For example, to effectively align a target object and the reticle 1256, the user may tilt, turn or otherwise reorient his or her head to a pose corresponding to the location of the target object. Once the reticle 1256 and the target object are aligned, the user may select the target object to which the reticle 1256 is hovering or pointing. In certain embodiments, the target object may also receive a focus indicator (e.g., virtual rays emanating from the reticle 1256 or selected object or other graphical highlighting).

Accelerating a Position of a Reticle

Figure 13A:
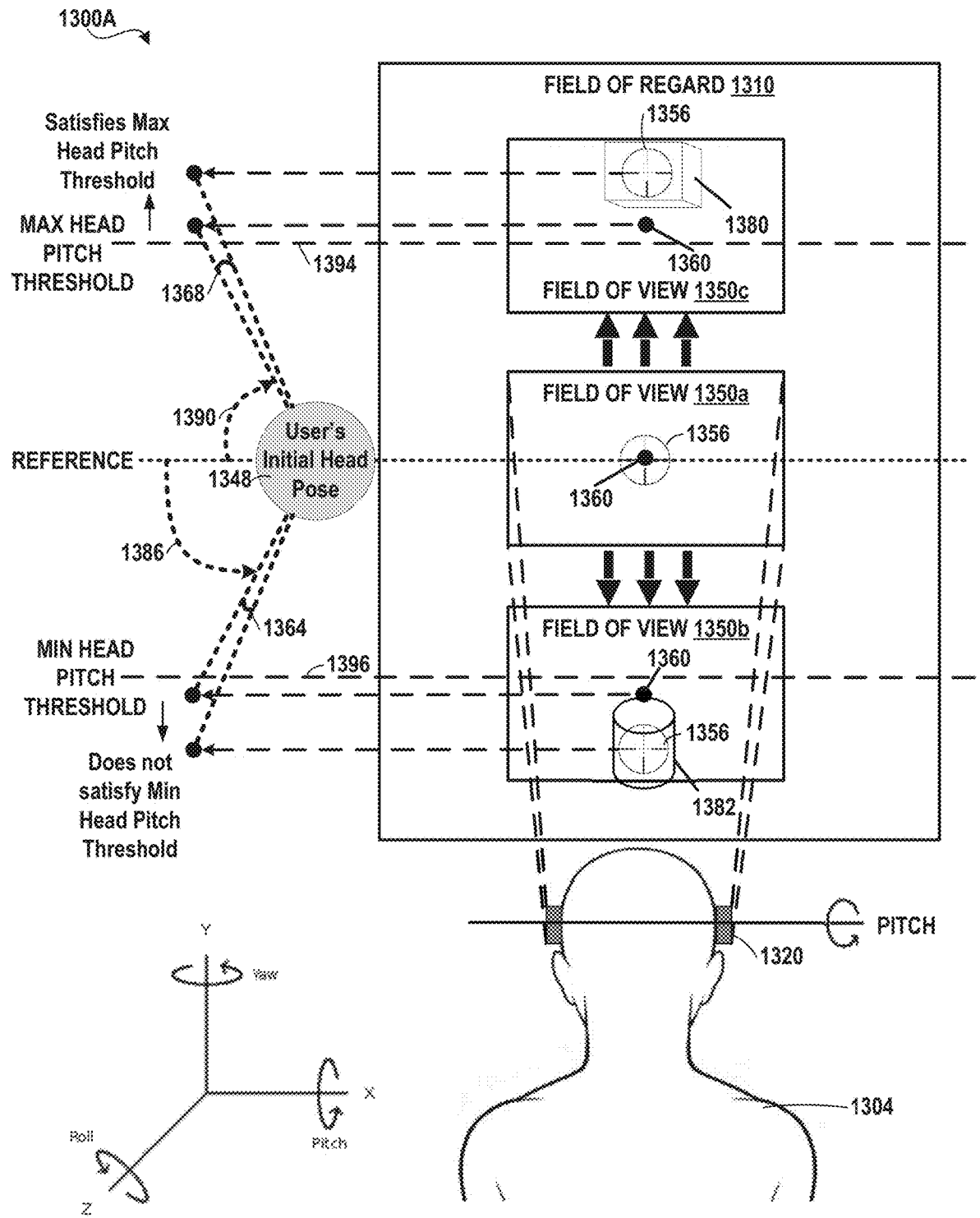
FIGS. 13A and 13B demonstrate examples of accelerating movement of a reticle responsive to changes in head pose vertically (FIG. 13A) and horizontally (FIG. 13B).
Figure 13B:
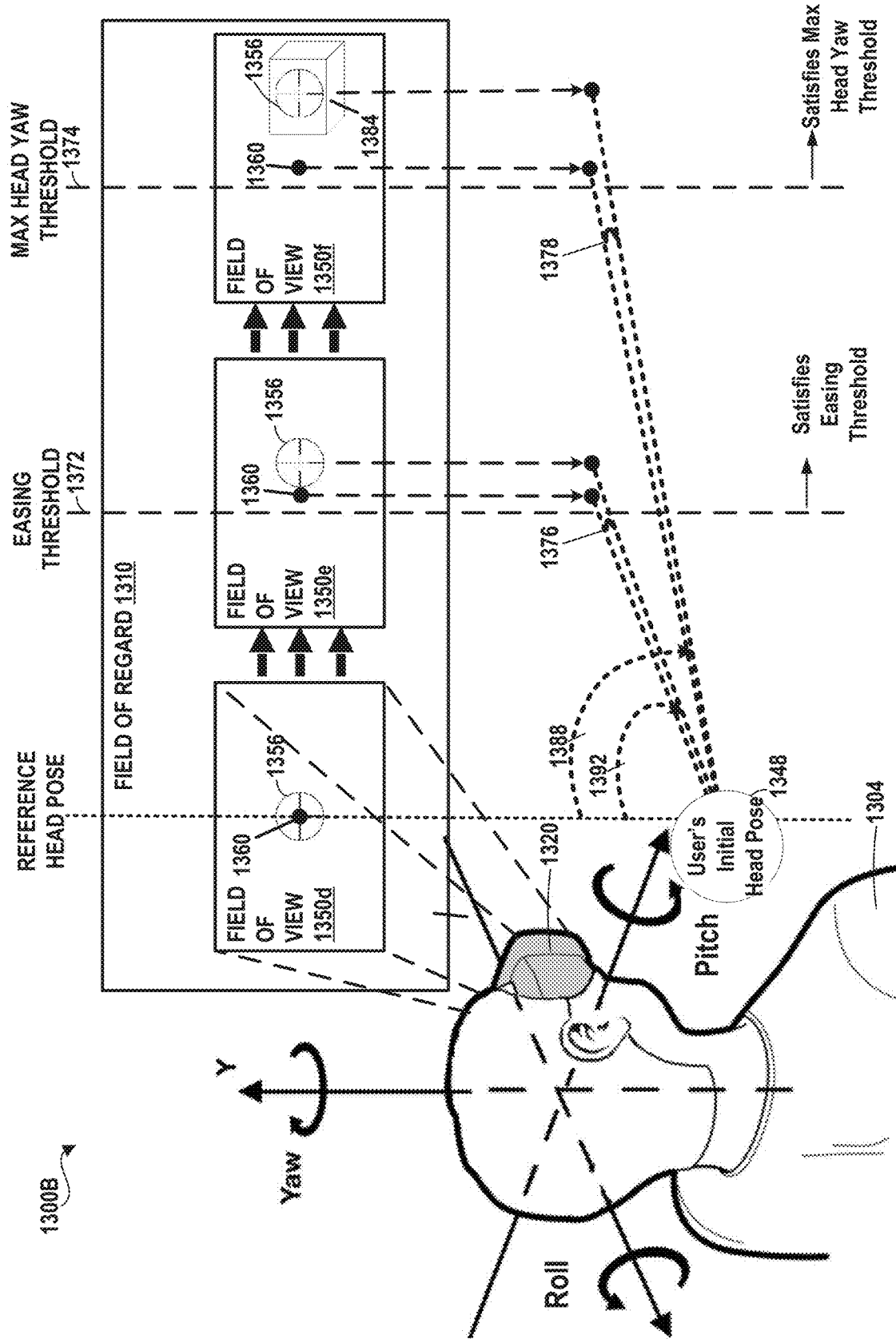

FIGS. 13A-13B demonstrate examples of accelerating movement of a reticle responsive to changes in head pose. The environments 1300A, 1300B include a user 1304 wearing wearable system 1320, such as system 200 of FIG. 2, and further include a representation of the wearable system's 1320 field of regard (FOR) 1310. As described with reference to FIG. 4, the FOR 1310 comprises a portion of the environment around the user 1304 that is capable of being perceived by the user via the wearable system 1320.

The user 1304 can move his or her body, head, or eyes to perceive substantially any direction in the FOR 1310. For example, the user's head may have multiple degrees of freedom. As the user's head moves (e.g., tilts or turns), the user's head pose changes. Changes in head pose can be quantified by determining changes in an angle with respect to a reference head pose vector. The reference head pose can be any head pose of the user. For example, when considering coordinate values in the x-y-z coordinate systems shown in FIGS. 13A and 13B, a reference head pose vector may correspond to a position of the user's head when each of the coronal plane of the user's head (e.g., vertical plane that divides the body into belly and back sections), the sagittal plane of the user's head (e.g., an anatomical plane which divides the body into right and left parts), and the axial plane of the user's head (e.g., a plane that divides the body into superior and inferior parts, roughly perpendicular to spine) of the user's head are orthogonal to one another.

In some applications, a user may look to a particular direction more frequently, and the system may adjust the reference head pose to reduce or ameliorate the neck strain. For example, a game relating to shooting flying birds and a star gazing application that teaches users about constellations may both involve a user periodically or constantly looking upward. Similarly, a game of chess may involve a user periodically or constantly looking downward. Other games or applications may involve a user periodically or constantly looking left, right, diagonally, or the like. Accordingly, in some cases, the reference head pose can be updated to hedge toward a head pose associated with this more frequent direction. For example, the reference head pose can be an average or most-common head pose of a user over a particular period of time or an average or most-common head pose of a user while the user uses the particular application or plays the particular game. By configuring the reference head pose to hedge toward or match a head pose associated with a common or average head pose of the user, the system can reduce or ameliorate the neck strain.

The coordinate systems in FIGS. 13A and 13B show three angular degrees of freedom (e.g., yaw, pitch, and roll) that can be used for measuring the head pose relative to the reference head pose vector. For example, the user's head can tilt forward or backward (e.g., pitching), turn left or right (e.g., yawing), or tilt side to side (e.g., rolling), and an angular difference between the new head pose and the reference head pose vector can be determined to quantify the changes. In other implementations, other techniques or angular representations for measuring head pose can be used, for example, quaternion angles or any type of Euler angle system.

As the user's pose changes (e.g., body, head or eye pose), the user's FOV may correspondingly change, and any objects within the FOV may also change. FIG. 13A illustrates three FOVs 1350a, 1350b, 1350c which are schematically represented by rectangles, and which can correspond to a portion of the user's FOR 1310 that is observed at a distinct period in time. In each of the three illustrated scenes 1350a, 1350b, 1350c, a user can perceive a reticle 1356 via the display 1320. In addition, as illustrated in FOVs 1350b, 1350c, a user can perceive target objects, such as cylinder 1382 or box 1380, which can represent a virtual or a physical object that is at a given location in the user's environment. As the user adjusts his or her head (e.g., pitching, yawing or rolling), the system may adjust the user's FOV such that the user perceives that he or she is tilting or turning his or her head in the VR/AR/MR environment.

As a non-limiting example, the user 1304 may desire to view or interact with object 1380 and/or object 1382. For simplicity, an initial pose of the user's head 1348 corresponds to the reference head pose vector, as described herein. In addition, at the initial head pose 1348, the user perceives FOV 1350a. Because no objects are perceivable within FOV 1350a, the user may begin to scan the FOR 1310 to search for the objects 1380, 1382. As the user tilts his or her head down toward the floor, the user's FOV correspondingly adjusts such that the user may eventually perceive object 1382 within FOV 1350b. The user may continue to scan the FOR 1310 to search for more objects, for instance, by tilting his or her head up toward the ceiling. At some later point in time, the user may adjust his or her head pose such that the user perceives FOV 1350c. As illustrated, the object 1380 is perceivable in FOV 1350c. In some instances, in addition to simply perceiving the object, the user may also select the object using the reticle 1356.

The reticle 1356 can be positioned on a target object using various methods. As a first example, the user's FOV may be temporarily or permanently fixed within the FOR. Accordingly, a change in the user's pose (e.g., head pose, body pose, eye pose) may cause a reticle to move within the user's FOV (e.g., relative to a default reticle position, which may be near the center of the FOV), but does not cause the user's FOV to change. For example, if the user looks up or tilts his or her head back, the movement may cause the reticle to move up within the FOV, such as moving closer to the top of the FOV. Accordingly, in examples such as these, to select an object using the reticle, the object may need to be within the FOV and the user may need to position his or her head such that the reticle points to the target object.

As a second example, the position of a reticle within a FOV may be temporarily or permanently fixed. Accordingly, a change in the user's pose may alter the user's FOV, but does not change the location of the reticle within the FOV. For example, a reticle may be fixed or locked at a location (e.g., the center) of the user's FOV, such as illustrated in FOV 1350a. As the user's pose changes, the FOV may change, but the reticle remains at a default position (e.g., the center) of the dynamic FOV. Accordingly, to select an object using the reticle, the user may need to position his or her head such that the target object is at center of the FOV (e.g., the position of the reticle).

As a third example, the reticle can be positioned on a target object using a combination of the first two examples. The reticle may be temporarily fixed at a position within the FOV. For example, the reticle may be fixed when the user's head pose is between a minimum head pose threshold and a maximum head pose threshold (e.g., satisfies a minimum head pose threshold and does not satisfy a maximum head pose threshold). As the user's pose changes, the user's FOV may change while the position of the reticle within the FOV remains the same. However, as the user's head moves toward an uncomfortable or otherwise undesired pose (e.g., the user's head pose does not satisfy a minimum head pose threshold or satisfies a maximum head pose threshold), the reticle may become unfixed and may be free to move within the user's FOV. For example, the wearable system may accelerate the movement of the reticle in a direction corresponding to a direction to which the user's head is moving. In some instances, this acceleration may reduce a likelihood of neck strain or discomfort, because the reticle moves toward the position the user is moving his or her head, thereby reducing or minimizing the amount of head movement needed to position the reticle with a target object. Although the reticle is accelerated, in some embodiments, the reticle is not accelerated past a threshold position (e.g., a position within the FOV). For example, in some cases, the reticle is not accelerated out of the user's FOV. This advantageously aids in reducing a likelihood of neck strain or discomfort while also retaining the user's ability to interact with the objects in the FOV via the reticle.

At times when the user desires to reorient his or her head (non-limiting example: to select an object that is high in the air (e.g., the ceiling), low to the ground (e.g., the floor), far to the right, far to the left, etc.), the user may have to bend, twist or crane his or her neck such that the reticle 1356 is positioned at the desired object. The bending, twisting, and/or craning of the user's neck can result in, among other things, neck strain or discomfort. Accordingly, the wearable system can recognize that an orientation of a user's head is outside of a range (e.g., below a minimum head pose threshold, above a maximum head pose threshold) of acceptable (e.g., comfortable, non-straining, etc.) head poses. As a result, to assist the user in moving the reticle 1356, the wearable system may accelerate the movement (e.g., adjust an angle relative to a reference head pose vector or adjust the position within the FOV) of the reticle 1356 in a direction corresponding to a direction to which the user's head is moving. By accelerating the movement of the reticle 1356, the wearable system advantageously reduces a degree to which the user must bend, twist or crane his or her neck to align the reticle 1356 and target object, thereby reducing a likelihood of neck strain or discomfort.

Returning to FIG. 13A, the reticle 1356 within FOV 1350*a* is at a fixed location at the center 1360 of the FOV 1350*a*. As the user tilts his or her head toward the ceiling or the floor, the wearable system may make real-time determinations of the user's head pose. If the user's head pose begins to correspond to any of a range of undesired, uncomfortable, or straining head poses, the wearable system may begin to accelerate the reticle 1356.

For example, as illustrated in FIG. 13A, the user's real time head pose can be compared with one or more threshold head poses (e.g., max head pitch threshold 1394, min head pitch threshold 1396) to determine whether the user's head pose corresponds to or falls within one or more of a range of desired or undesired head poses. The wearable system 1320 can determine the user's head pose by calculating one or more angles corresponding to the degree at which the user is bending, turning, tilting, or rotating his or her neck. For example, the angular difference between a vector corresponding to the user's current head pose and a reference head pose vector can be calculated. If the one or more angles correspond to angles associated with undesired head poses, the wearable system may accelerate the movement of the reticle 1356, for instance, by adding or removing an offset to an angle associated with the reticle to adjust the reticle position within the FOV.

Examples of the addition of the offset are illustrated in FIG. 13A and FIG. 13B. As a first example, and continuing with the example where the user's initial head pose corresponds to FOV 1350*a*, the user must tilt his or her head down towards the ground to perceive FOV 1350*b*. When the user's head pose is at an angle such that the user perceives the FOV 1350*b*, the system can determine an angle 1386 between the user's new head pose and a reference head pose (e.g., the user's initial head pose 1348). As illustrated in FIG. 13A, the user's new head pose, which corresponds to the center 1360 of FOV 1350*b*, is below (or does not satisfy) a minimum head pitch threshold 1396. Based on the user's new head pose, the system may determine that the user is looking down and/or the user's head or neck is in, or is headed towards, an uncomfortable or otherwise undesirable pose. Accordingly, the system may accelerate the reticle 1356 in a downward direction such that the position is no longer in the default reticle position (e.g., the center) of the FOV. To make this adjustment to the reticle position, the system may add an offset 1364 to the angle 1386 at which the reticle is positioned relative to the reference head pose. The offset (e.g., about 12 degrees) can be added to the angle 1386 using various methods known in the art. For example, the offset 1364 can be added to or subtracted from the angle 1386 to make the new angle more negative. Similarly, the offset can increase or decrease the absolute value of the new angle.

As another example, and continuing with the assumption that user's initial head pose corresponds to FOV 1350*a*, the user must tilt his or her head up towards the ceiling to perceive FOV 1350*c*. When the user's head pose is at an angle such that the user perceives the FOV 1350*c*, the system can determine an angle 1390 between the user's new head pose and a reference head pose (e.g., the user's initial head pose 1348). As illustrated in FIG. 13A, the user's new head pose, which corresponds to the center 1360 of FOV 1350*c*, is above (or satisfies) a maximum head pitch threshold 1394. Based on the user's new head pose, the system may determine that the user is looking up and/or the user's head or neck is in, or is headed towards, an uncomfortable or otherwise undesirable pose. Accordingly, the system may accelerate the reticle 1356 in an upward direction such that the position is no longer in the default reticle position relative to the FOV (e.g., the center of the FOV). To make this adjustment to the reticle position, the system may add an offset 1368 to the angle 1390 at which the reticle is positioned relative to the reference head pose. The offset (e.g., about 8 degrees) can be added to the angle 1390 using various methods known in the art. For example, the offset 1368 can be added to or subtracted from the angle 1390 to make the new angle more positive. Similarly, the offset can increase or decrease the absolute value of the new angle.

As another example, similar to FIG. 13A, FIG. 13B illustrates three FOVs 1350*d*, 1350*e*, 1350*f* which are schematically represented by rectangles, and which can correspond to a portion of the user's FOR 1310 that is observed at a distinct period in time. In each of the three illustrated scenes 1350*d*, 1350*e*, 1350*f*, a user can perceive a reticle 1356 via the display 1320. Initially, the reticle 1356 is at a fixed location at the center 1360 of the FOV 1350*d*. As the user turns his or her head to the right, the wearable system 1320 may make real-time determinations of the user's head pose. As the user's head pose begins to move toward any of a range of undesired, uncomfortable, or straining head poses, the wearable system may begin to accelerate the reticle 1356, thereby moving the reticle from the fixed location within the FOV.

As a non-limiting example, the user 1304 may desire to view or interact with object 1384. For simplicity, the initial pose of the user's head 1348 corresponds to the reference head pose, as described herein, and the initial FOV perceived by the user is FOV 1350*d*. As the user's head pose changes, the head pose can be compared with one or more thresholds head poses (e.g., max head yaw threshold 1374, easing threshold 1372, min head yaw threshold, etc.) to determine whether the head pose passes a threshold and the reticle position should be accelerated.

Returning to the example, the user may begin to scan the FOR 1310 to search for object 1384. As the user turns his or her head to the right, the user's FOV correspondingly adjusts such that the user may eventually perceive FOV 1350*e*. While perceiving FOV 1350*e*, the user's head pose (which may correspond to the center of 1360 of the FOV 1350*e*) satisfies easing threshold 1372. Accordingly, the system may accelerate the position of the reticle 1356 such that it is positioned slightly right of the center 1360 of the FOV 1350*e*. For example, the system may add an offset 1376 (e.g., corresponding to an easing function) to the angle 1392 corresponding to the reticle 1356 in FOV 1350*e*.

The user may continue to scan the FOR 1310 to search for object 1384, for instance, by turning his or her head more to the right. At some later point in time, the user may adjust his or her head pose such that the user perceives FOV 1350*f*. As illustrated, the object 1384 is perceivable in FOV 1350*f*, and it may be advantageous for the system to accelerate the reticle, for example, toward the object 1384, to make it easier for the user to select the object. Accordingly, system may determine that the user's head pose (which may correspond to the center of 1360 of the FOV 1350*f*) satisfies a maximum head yaw threshold 1374. As such, the system may accelerate the position of the reticle 1356 such that it is positioned even more right of the center of the FOV 1350*e* than the reticle positioned in FOV 1350*e*. For example, the system may add a larger offset 1378 to the angle 1388 corresponding to the reticle in FOV 1350*f*.

In some instances, in order to determine an amount of cursor acceleration in the horizontal direction, the system determines a pose of the user's head relative to the user's body, torso, shoulders, etc. For example, more neck strain may be more likely if a head pose vector is more offset from a body pose vector. Accordingly, the system may accelerate a reticle at a relatively faster or slower rate depending on the alignment of the user's head, neck, shoulders, body, etc.

In some cases, an additional inertial measurement unit (IMU) configured to track a body, torso, or shoulder's pose of the user can be added and the system can determine an angle or position of the user's head relative to the user's body. The additional IMU can include an auxiliary device on the shoulders, chest or waist of the patient such as a pin, a necklace, a backpack, a belt pack, a totem, etc. In some embodiments, the system can include an external or user-facing sensor or camera that can, for instance, use computer vision processing to calculate a body vector.

Although the examples illustrated in FIGS. 13A and 13B correspond to a user tilting his or her head up to down and turning his or her head to the right, this is not a limitation, and diagonal head movements (e.g., combinations of vertical and horizontal movements) can be measured and the reticle accelerated to a corner of the FOV if a diagonal threshold (or combination of vertical and horizontal thresholds) is passed. Further, the user can move his body, head, or eyes to perceive substantially any direction in space. In some embodiments, similar to adjusting the user's FOV based on a change in head pose, the system may adjust a position or location of a reticle based on a change in eye pose (e.g., eye gaze). The eye pose can be determined by the inward facing imaging system 504 (shown in FIG. 4). The system can determine, using one or more thresholds, whether the user's eyes may be strained and can alter a position of the reticle based on that determination.

Example Head Pose Angle Adjustments

FIG. 14 illustrates examples of adjusting position of a reticle based on the user's head pose. The wearable system, such as wearable system 200 of FIG. 2, can determine a user's head pose, for example, by determining a head pose vector corresponding to the user's head pose. Based on an angular difference between a head pose vector and a reference vector, the system can adjust a position of a reticle relative to a user's FOV. As described herein, the wearable system can include one or more head pose sensors such as, e.g., an IMU, which can be used to determine head pose, or an eye-tracking camera, which can be used to determine eye gaze. The wearable system can use data from such sensors to determine the poses and angles described herein.

A head pose vector can provide an indication of the user's head pose. For example, a head pose vector can illustrate where the user is gazing, how the user's head is oriented, how the user's neck is bent, etc. In some embodiments, the head pose vector can be defined as a vector extending orthogonally from a coronal plane (e.g., frontal plane that divides the user's head into ventral and dorsal sections) of the user's head. For example, the head pose plane may be a plane which is parallel (or substantially parallel) to the user's forehead. In some embodiments, the head pose plane can be parallel to the coronal plane, and can comprise a line connecting the user's eyes or other facial features. In some embodiments, the head pose vector can orthogonally extend from the coronal plane (or a plane parallel to the coronal plane) from a central point on the user's head such as a center of the user's forehead, the center of the user's eye, the user's nose, etc. In some embodiments, the head pose vector can extend from any other point corresponding to the user's head or neck. Accordingly, as the user's head pose changes, the head pose vector also changes. As a few examples, FIG. 14 illustrates various example head pose vectors 1408, 1412, 1416, 1420, 1424, 1428.

A reference vector may be a subset of the potential head pose vectors and may be used as a reference to determine an angle at which the user's head is tilted or turned. The reference vector can be a vector corresponding to any head pose. For example, when considering the coordinate values in the x-y-z coordinate system shown in FIG. 14, the reference vector may be equivalent to a head pose vector having a vertical or y-component of zero (sometimes termed a level head pose vector 1416). In some cases, the reference vector is determined by identifying a vector in a horizontal plane that is perpendicular to a plane of the display. In some embodiments, the reference vector may be the head pose vector when the user's head is in a natural resting state (for example, as a neutral head pitch vector 1420). In some embodiments, the level head pose vector corresponds to a position of the user's head when each of the coronal plane of the user's head (e.g., vertical plane that divides the body into belly and back sections), the sagittal plane of the user's head (e.g., an anatomical plane which divides the body into right and left parts), and the axial plane of the user's head (e.g., a plane that divides the body into superior and inferior parts, roughly perpendicular to spine) of the user's head are orthogonal to one another. As illustrated in FIG. 14, in some instance the angular difference between the neutral head pitch vector 1420 and the level head pose vector 1416 is approximately −20 degrees (e.g., the neutral head pitch vector 1420 is approximately 20 degrees below the level head pose vector 1416). In some applications, a user may look to a particular direction more frequently, and the system may adjust the reference head pose to reduce or ameliorate the neck strain. For example, a game relating to shooting flying birds and a star gazing application that teaches users about constellations may both involve a user periodically or constantly looking up. Similarly, a game of chess may involve a user periodically or constantly looking down. Other games or applications may involve a user periodically or constantly looking left, right, diagonally, or the like. Accordingly, in some cases, the reference head pose can be updated to hedge toward a head pose associated with this more frequent direction. For example, the reference head pose can be an average or most-common head pose of a user over a particular period of time or an average or most-common head pose of a user while the user uses the particular application or plays the particular game. By configuring the reference head pose to hedge toward or match a head pose associated with a common head pose of the user, the system can reduce or ameliorate the neck strain.

As described herein, the wearable system can identify a range of head positions or a range of head orientations, which together serve to specify one or more ranges of head poses that may correspond to uncomfortable or straining head poses. The bounds of such ranges may be seen as corresponding to thresholds. For example, if a user tilts or turns his or head too far in one direction, the user's head pose may fail to satisfy (e.g., be less than) a minimum head pitch, head yaw, or head roll threshold. Similarly, if the user tilts or turns his or her head too far in another direction, the user's head pose may satisfy (e.g., be greater than) a maximum head pitch, had yaw, or head roll threshold. In instances such as these, head poses which are less than (or fail to satisfy) a minimum head pose threshold and head poses which are greater than (or satisfy) a maximum head pose threshold may correspond to one or more ranges of head tilting or turning which may cause neck strain or discomfort.

FIG. 14 illustrates three examples of an adjustment to a position, or an adjustment to an angle relative to a reference head pose, of the reticle. In a first example, the user's head pose corresponds to head pitch vector 1420 that, in this example, corresponds to a neutral head pose threshold. The neutral head pose threshold, as described herein, may correspond to a natural resting state of the head and may represent a more comfortable head pose of the user than, say, a level head pose 1416. Accordingly, in some instances, a neutral head pose vector may be used as a reference head pose vector instead of, or in addition to, a level head pose vector.

Returning to the first example, a −20 degree angular difference exists between head pitch vector 1420 and the reference head pose vector 1416 which, in this case, is also a level head pose vector 1416. Based on the determined angular difference of −20 degrees, the system determines that the user's head pose is above (e.g., satisfies) the minimum pitch threshold of −45 degrees. In addition, the system determines that the angular difference of −20 degrees is below (e.g., does not satisfy) the maximum pitch threshold of 5 degrees. Based on these determinations, the system may determine not to adjust the position of the reticle. Accordingly, as seen in scene 1436, the reticle remains at a default location (e.g., the center) within the scene 1436.

In a second example, the user's head pose corresponds to head pose vector 1412. As illustrated, a +5 degree angular difference exists between head pose vector 1412 and the reference head pose vector 1416. Based on the determined angular difference of +5 degrees, the system determines that the user's pose is equal to (e.g., satisfies) a maximum pitch threshold of +5 degrees. Accordingly, the system adjusts an angle of the reticle by an offset amount, in this case 8 degrees. This adjustment can be seen in scene 1432, where the position of the reticle appears towards the top of scene 1432, rather than at the default position (e.g., the center) of scene 1432.

In a third example, the user's head pose corresponds to head pose vector 1424. As illustrated, a −45 degree angular difference exists between head pose vector 1424 and the reference head pose vector 1416. Accordingly, based on the determined angular difference of −45 degrees, the system determines that the user's pose is equal to (e.g., does not satisfy) a minimum head pitch threshold of −45 degrees. Accordingly, the system adjusts an angle of the reticle by an offset amount, in this case −12 degrees. This adjustment can be seen in scene 1440, where the position of the reticle appears towards the bottom of scene 1440, rather than at the default position (e.g., the center) of scene 1440.

It should be noted that the examples shown in FIG. 14 are merely illustrative and should not be construed as limiting. Accordingly, in some embodiments a reference vector other than the level head pose vector 1416 is used to determine angular difference. Fewer, more, or different thresholds can be used by the system to determine whether a head position passes a threshold and to adjust a position of the reticle. Further, the values corresponding to the maximum head pitch threshold 1412, the minimum head pitch threshold 1424, the neutral head pitch vector 1420, the offset amount corresponding to the maximum head pitch threshold 1412 and/or the offset amount corresponding to the minimum head pitch threshold 1424 are for purposes of illustration. In other implementations, the maximum head pitch threshold 1412 can be in a range from 10 degrees below the level head pose vector 1416 to 25 degrees above the level head pose vector 1416. The minimum head pitch threshold 1424 can be in a range from 60 degrees below the level head pose vector 1416 to 30 degrees below the level head pose vector 1416. The neutral head pitch vector 1420 can be in a range from 30 degrees below the level head pose vector 1416 to level with the level head pose vector 1416. The offset amount corresponding to the maximum pitch threshold 1412 can be in a range of +1 degree to +25 degrees. The offset amount corresponding to the minimum pitch threshold 1424 can be in a range of −1 degree to −25 degrees. In addition, the one or more thresholds may be satisfied in various ways. For instance, in some cases, a value equivalent to the threshold value will satisfy the threshold, while, in other cases, a value equivalent to the threshold value will not satisfy the threshold.

Example Head Pose Angle Adjustments to the Position of a Reticle

Figure 15:
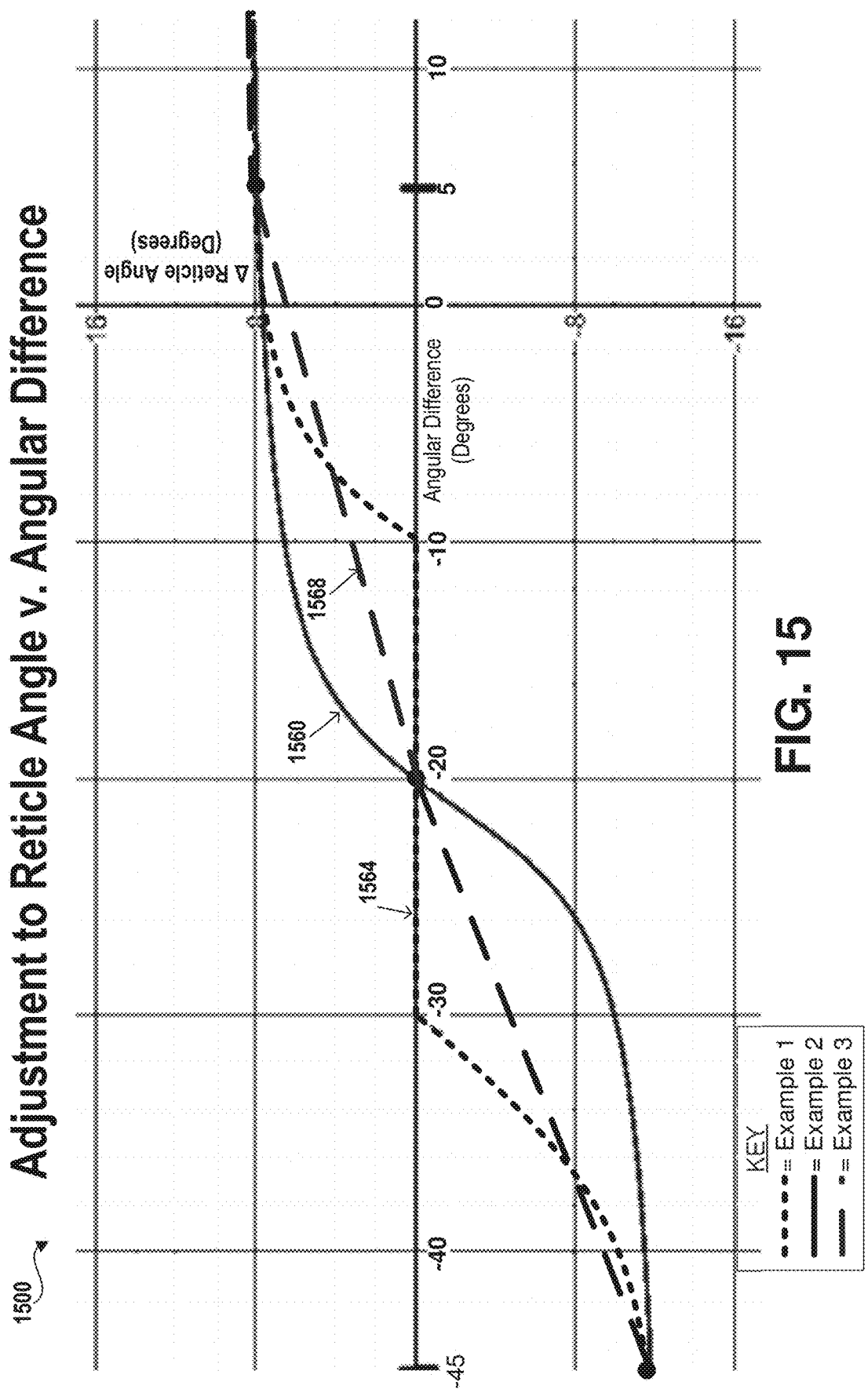
FIG. 15 demonstrates an example relationship between a user's head pose and an adjustment to position of a reticle.

FIG. 15 demonstrates example relationships between a user's head pose and an adjustment to position of a reticle. The graph 1500 illustrates example reticle angle adjustments versus an angular difference. As described herein, angular difference (e.g., the x-axis) can be defined as the difference in angle between a head pose vector and a reference vector (e.g., a level head pose vector, a neutral head pose vector, etc.) In addition, an adjustment to the reticle angle (e.g., the y-axis) can correspond to how the system changes the position of the reticle based on determined head pose.

Graph 1500 illustrates several different possible relationships (e.g., lines 1560, 1564, 1568) between the adjustment to the reticle angle and the angular difference. For example, lines 1560, 1568 illustrate a gradual adjustment to the reticle angle as the angular difference changes, while line 1564 illustrates no adjustment to the reticle angle within a specified range (e.g., −30 degrees to −10 degrees) and then a gradual adjustment to the reticle angle as the angular difference extends outside of the specified range (e.g., below a minimum head pose threshold, above a maximum head pose threshold).

As illustrated by each of the relationships 1564, 1560, and 1568, if the angular difference is 5 degrees or higher (e.g., the user is looking up at about 5 degrees or more above a level head pose vector), then the system determines that the user's head pose is greater than or equal to (e.g., satisfies) a maximum head pitch threshold (e.g., +5 degrees). Accordingly, the system adjusts an angle of the reticle by a maximum offset amount of 8 degrees. In addition, if the angular difference is less than or equal to −45 degrees (e.g., the user is looking down about 45 degrees or more below a level head pose vector), then the system determines that the user's head pose is less than or equal to (e.g., does not satisfy) a minimum head pitch threshold (e.g., −45 degrees). Accordingly, the system adjusts an angle of the reticle by a minimum offset amount of −12 degrees.

Furthermore, if the angular difference is between about −45-degrees and about 5 degrees (e.g., between the minimum head pose threshold and the maximum head pose threshold), then the system determines that the user's head pose is greater than (e.g., satisfies) a minimum head pitch threshold and is less than (e.g., does not satisfy) a maximum head pitch threshold. Accordingly, the system adjusts an angle of the reticle by an offset amount, which can be determined, for example, by various linear, exponential, piecewise, or easing functions. For example, an easing function can provide progressively increasing or decreasing reticle angle adjustments.

Example Processes of Reticle Positioning

Reticle Positioning or Adjustment Based on Head Pose

Figure 16:
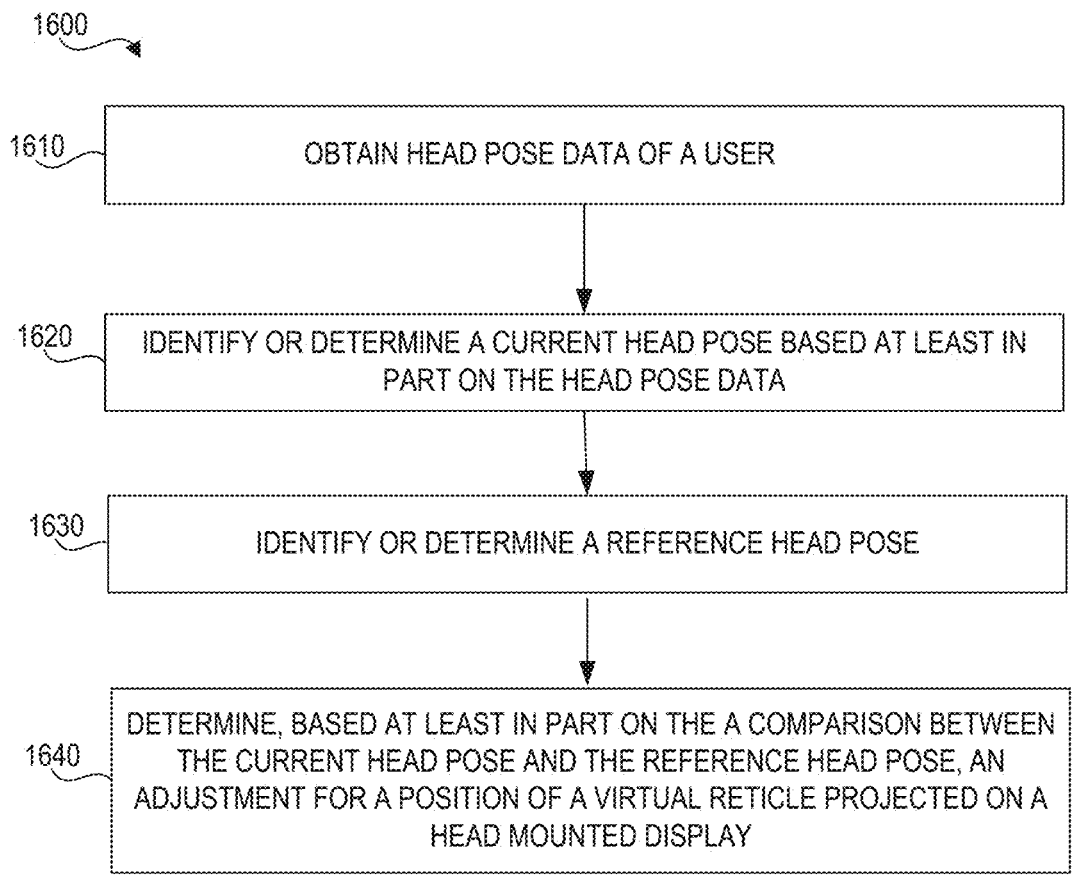
FIG. 16 illustrates a flowchart for an example reticle position adjustment process.

FIG. 16 illustrates a flowchart for an example reticle position adjustment process 1600. The example process 1600 may be performed by one or more components of the wearable system 200 such as, e.g., the remote processing module 270 or the local processing and data module 260, alone or in combination. The display 220 of the wearable system 200 can present reticle(s) to the user, the inward-facing imaging system 462 can obtain the eye images for eye gaze determination, and IMUS, accelerometers, or gyroscopes can determine head pose.

At block 1610, the wearable system can receive data indicating the user's current head pose. A head pose can describe a position and an orientation of the user's head. The data can include the current position and orientation of the user's head or the movements of the user's head in the 3D space. The position may be represented by translational coordinate values (such as, e.g., coordinate values in an x-y-z coordinate system shown in FIG. 6). For example, as the user's head tilts or turns, the wearable system can track and record the user's head movements. The orientation may be represented by vectors or angular values relative to a natural resting state of the head. For example, the vectors or angular values can represent the head tilting forward and backward (e.g., pitching), turning left and right (e.g., yawing), and tilting side to side (e.g., rolling).

The wearable system can identify a range of head positions or a range of head orientations, which together serve to specify one or more ranges of head poses which may correspond to uncomfortable or straining head poses. The bounds of such ranges may be seen as corresponding to thresholds. For example, a maximum or minimum head pitch, head yaw, or head roll threshold may correspond to one or more ranges of head tilting or turning left which may cause neck strain or discomfort. Similarly, a neutral or reference head pose threshold may correspond to a natural resting state of the head.

The head poses that fall within these ranges can correspond to head poses in which an adjustment to a position of reticle may be desired. For example, the wearable system can render a reticle in 3D space for a user. The reticle may be rendered in a rig space (which may be represented by a coordinate system with respect to an HMD. The reticle may be represented in a variety of graphical forms, which may include 1D, 2D, and 3D images.). The reticle may correspond to the user's current position with respect to the user's field of view, and may represent, for example, the user's direction of gaze. When the user moves around, the reticle may also move with the user. As the user's head pose changes, for example such that it falls within one of the aforementioned ranges, the position of the reticle may be adjusted to prevent, ease or lessen neck strain or discomfort.

The wearable system can track the head poses using one or more sensors internal to an HMD such as, e.g., an IMU or an outward-facing imaging system (e.g., to track a reflected image of the user's head) or external to the HMD (such as, e.g., a camera mounted to a wall in the user's room).

At block 1620, the wearable system can identify or determine, based at least in part on the head pose data acquired from block 1610, a real-time head pose of the user. For example, the wearable system can identify or determine a head pose vector, as described herein, which corresponds to the user's head pose. In some cases, the head pose vector is determined using an AR software development kit (SDK).

At block 1630, the wearable system can identify, access, or determine a reference head pose of the user. For example, the reference head pose can correspond to a neutral head pose and may be based at least in part on the head pose data acquired from block 1610. The wearable system can determine a reference head pose vector, as described herein, which can correspond to a neutral head pose, such as the head pose relative to a natural resting state of the head. In some cases, the reference head pose vector is determined using an AR SDK. In some implementations, the reference or neutral head pose of the user is set at a default value (e.g., at an angle −20 degrees), and the wearable system determines the reference head pose by accessing the default value (e.g., by querying the AR SDK).

At block 1640, the wearable system can determine, based at least in part on the a comparison between the current head pose and the reference head pose, an adjustment for a position of a virtual reticle projected on a head mounted display. For example, the system can determine a value indicative of a difference between the head pose determined from block 1620 and the reference head pose determined from block 1630. For example, an angular difference between the head pose and the reference head pose can be calculated with respect to coordinate values (such as, e.g., coordinate values in an x-y-z coordinate system shown in FIG. 6). In some embodiments, the wearable system can determine the angular difference between the head pose vector and the reference head pose vector. For example, as shown in FIG. 14, the angular difference can be used to determine an angle that corresponds to a degree of tilting or turning of the user's head with respect to a reference head pose. Based at least in part on the angular difference, the wearable system can determine whether the user is looking up or down, or otherwise tilting or turning his head. In some cases, the angular difference is determined using an AR SDK.

The wearable system can determine an adjusted reticle position based at least in part on the pose of the user's head. For example, the wearable system can determine whether the user has assumed a head pose that falls within one or more of the identified ranges of head poses. The wearable system can determine whether the user's head pose is at a position or orientation that can result in an adjustment of the position of the reticle. As an example, the wearable system can determine whether the user's head pose falls within the identified range of head positions and the identified range of head orientations. The wearable system may make such a determination by comparing the user's head pose with threshold values that define the bounds of the identified range of head positions (e.g., translational coordinate values), or by comparing the head orientation (e.g., angular difference) associated with the user's head pose with threshold values that define the bounds of the identified range of head orientations (e.g., angular values).

With reference to FIG. 14, based on a determination that the user has assumed a head pose corresponding to head pose vector 1412, the wearable system can determine that the angular difference (e.g., difference between reference head pose vector) is 5 degrees. Accordingly, by comparing the angular difference with threshold values (e.g., a neutral head pose threshold corresponding to vector 1416), the wearable system can determine if an adjustment of the position of the reticle is desired. For example, returning to the example of FIG. 14, the wearable system may determine that the angular difference of 5 degrees corresponding to head pose vector 1412 satisfies a maximum head pose threshold. The wearable system may then adjust the position of the reticle such that a head pose vector 1408 pointing to the newly adjusted reticle has an angular difference of 8 degrees. Accordingly, the wearable system can accelerate or decelerate reticle movement based at least in part on head pose or changes in head pose.

The various blocks described herein can be implemented in a variety of orders, and that the wearable system can implement one or more of the blocks concurrently and/or change the order, as desired. Fewer, more, or different blocks can be used as part of the process 1600. For example, the process 1600 can include blocks for determining a position of a reticle, providing an indication that the position of the reticle was updated, etc.

Furthermore, although process 1600 has been logically associated with preventing or reducing a likelihood of neck strain, similar techniques can be utilized to prevent or reduce a likelihood of eyestrain. For example, the system can obtain eye gaze data and from the eye gaze data can determine an eye gaze vector and a neutral eye gaze vector. The system can further determine an angular difference between the eye gaze vector and the neutral eye gaze vector and, based on the angular difference and one or more thresholds, can determine an adjustment for at least one of a position of the virtual reticle or a 3D view of the display.

Reticle Positioning or Adjustment Based on Angular Difference

Figure 17:
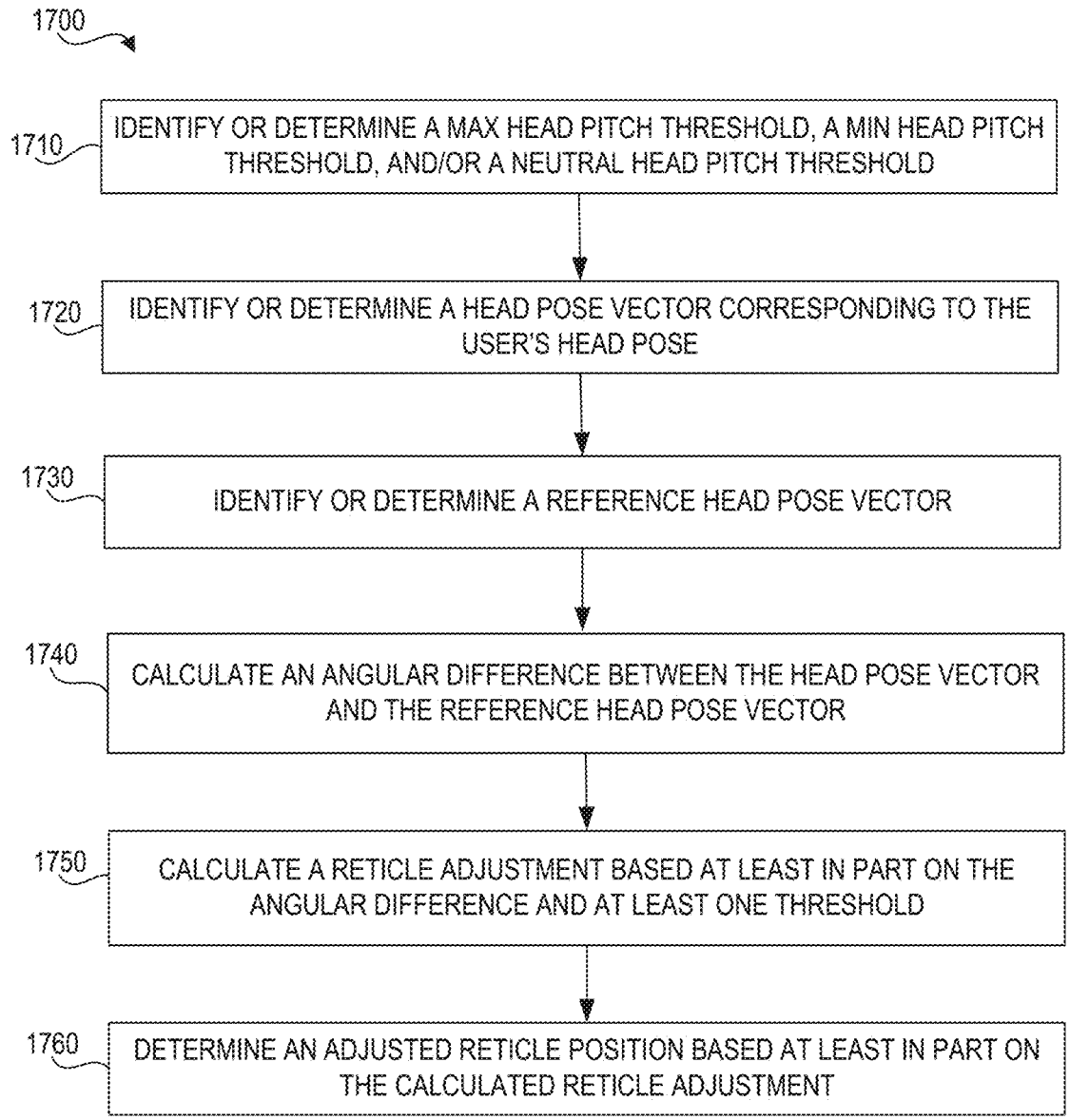
FIG. 17 illustrates a flowchart for an example reticle adjustment process.

FIG. 17 illustrates a flowchart for an example reticle adjustment process 1700. The example process 1700 may be performed by one or more components of the wearable system 200 such as, e.g., the remote processing module 270 or the local processing and data module 260, alone or in combination. The display 220 of the wearable system 200 can present reticle(s) to the user, the inward-facing imaging system 462 can obtain the eye images for eye gaze determination, and IMUS, accelerometers, or gyroscopes can determine head pose.

The wearable system can render a reticle in 3D space for a user. The reticle may be rendered in a rig space (which may be represented by a coordinate system with respect to an HMD. The reticle may be represented in a variety of graphical forms, which may include 1D, 2D, and 3D images.). The reticle may correspond to the user's current position with respect to the user's field of view, and may represent, for example, the user's direction of gaze. When the user moves around, the reticle may also move with the user. In addition, the reticle may point at one or more objects, and the user may select a target object to which the reticle is pointing. In some instances, the position of the reticle within the user's FOV may remain constant as the user's head moves. For example, the reticle may be positioned in the center of the user's field of view and will stay at the center, even as the user's FOV changes. Accordingly, in some cases, to select a target object with the reticle, the user must move his or her head to adjust the FOV such that the center of the FOV (e.g., the location of the reticle) is on the target object.

However, it may be advantageous for the wearable system to adjust a position of the reticle within the user's FOV. For example, in instances where the user desires to select a target object that is high in the air (e.g., the ceiling), low to the ground (e.g., the floor), far to the right, or far to the left, the wearable system can adjust the position of the reticle within the user's FOV to help the user position the reticle at the location of the target object, but without requiring the user to tilt or turn his or her head such that the center of the user's FOV is on the target object. Accordingly, the wearable system may implement process 1600 to adjust a position of a reticle.

At block 1710, the wearable system can identify or determine one or more ranges of head positions or ranges of head orientations, which together serve to specify one or more ranges of head poses which may correspond to uncomfortable or straining head poses. The bounds of such ranges may be seen as corresponding to thresholds. For example, the wearable system can identify or determine a maximum head pitch threshold and/or a minimum head pitch threshold that may correspond to a degree or angle of forward or backward head tilting that will results in maximum or minimum reticle angle adjustment. In some embodiments, the wearable system can identify or determine a maximum head yaw threshold or a minimum head yaw threshold which may correspond to a degree or angle of left or right head turning before a user's neck is in an uncomfortable or straining position. Similarly, the wearable system can identify or determine a maximum head roll threshold or a minimum head roll threshold which may correspond to a degree or angle of side to side head tilting before a user's neck is in an uncomfortable or straining position. Furthermore, the wearable system can identify or determine a neutral head pitch threshold, a neutral head yaw threshold, or a neutral head roll threshold which may correspond to a natural resting state of the head. In some cases, these thresholds may be user inputs, may be determined during a calibration stage, or may be constants within the system.

At blocks 1720 and 1730, the wearable system can determine, based at least in part on received head pose data, a head pose vector and reference (or neutral) head pose vector, as described herein.

At block 1740, the wearable system can determine an angular difference between the head pose vector and the neutral head pose vector. For example, as shown in FIG. 14, the angular difference can be used to determine an angle that corresponds to a degree of tilting or turning of the user's head with respect to a level head pose vector. Based at least in part on the angular difference, the wearable system can determine whether the user is looking up or down, or otherwise tilting or turning his head.

At block 1750, the wearable system can calculate a reticle position adjustment. Reticle position adjustments (e.g., angle adjustments or offsets) can be associated with each of the thresholds to help, for instance, accelerate cursor movement. For example, if the head pose satisfies a maximum head pitch threshold, maximum head yaw threshold, or a maximum head roll threshold, the wearable system may adjust an angle or position of the reticle by a first predetermined amount (e.g., +8 degrees). Similarly, if the head pose does not satisfy a minimum head pitch threshold, minimum head yaw threshold, or a minimum head roll threshold, the wearable system may adjust an angle or position of the reticle by a second predetermined amount (e.g., −12 degrees). In some embodiments, if the head pose satisfies a minimum threshold (e.g., pitch, yaw, or roll) and does not satisfy a maximum threshold (e.g., pitch, yaw, or roll), the wearable system may adjust an angle or position of the reticle using an easing function. For example, if the head pose satisfies a minimum head pitch threshold and does not satisfy a neutral head pitch threshold, the wearable system may adjust an angle or position of the reticle using the following equation 1:

$$VPA = \text{max}HPA * \text{ease}\left(\frac{P - neutralHP}{\text{max}HPA - neutralHP}\right) \quad \text{(Equation 1)}$$

where VPA is a vertical angular pitch adjustment, maxHPA is a maximum head pitch adjustment, P is the angle between a head pose vector an a level head pose vector, neutralHP is an angle corresponding to the neutral head pose vector, and ease( ) is an easing function such as easeOutSine.

Similarly, if the head pose satisfies a neutral head pitch threshold and does not satisfy a maximum head pitch threshold, the wearable system may adjust an angle or position of the reticle using the following equation 2:

$$VPA = \text{min}HPA * \text{ease}\left(\frac{P - \text{min}HPA}{\text{neutral}HP - \text{min}HP}\right) \qquad \text{(Equation 2)}$$

where VPA is a vertical angular pitch adjustment, minHPA is a minimum head pitch adjustment, P is the angle between a head pose vector an a level head pose vector, neutralHP is an angle corresponding to the neutral head pose vector, and ease( ) is an easing function such as easeOutSine.

The various blocks described herein can be implemented in a variety of orders, and that the wearable system can implement one or more of the blocks concurrently and/or change the order, as desired. Fewer, more, or different blocks can be used as part of the process 1700. For example, the process 1700 can include blocks for determining a position of a reticle, providing an indication that the position of the reticle was updated, etc.

Furthermore, although process 1700 has been logically associated with preventing or reducing a likelihood of neck strain, similar techniques can be utilized to prevent or reduce a likelihood of eye strain. For example, the system can obtain eye gaze data and from the eye gaze data can determine an eye gaze vector and a neutral eye gaze vector. The system can further determine an angular difference between the eye gaze vector and the neutral eye gaze vector and, based on the angular difference and one or more thresholds, can determine an adjustment for at least one of a position of the virtual reticle or a 3D view of the display.

Reticle Positioning or Adjustment Based on Head Pitch Thresholds

Figure 18:
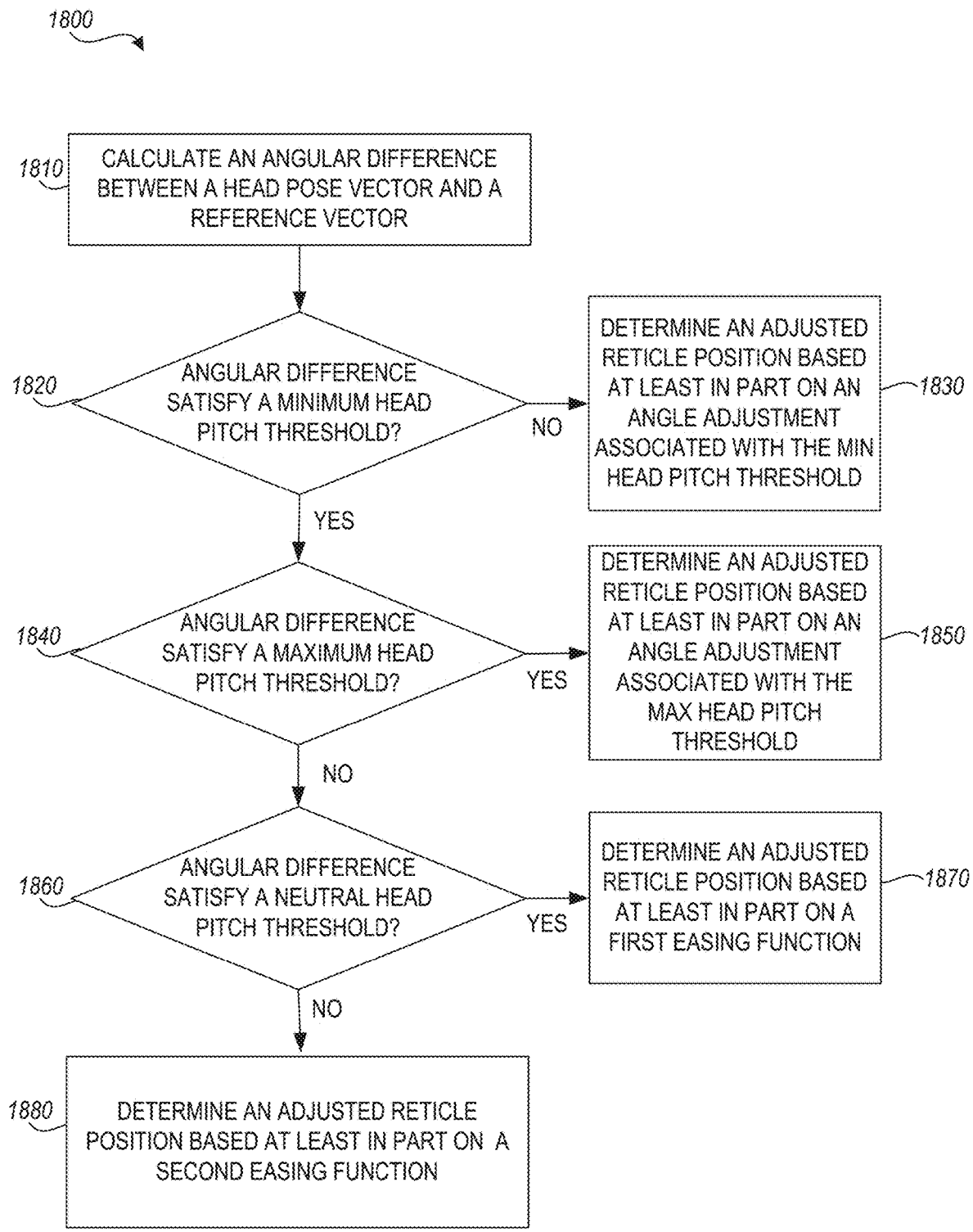
FIG. 18 illustrates a flowchart for another example reticle adjustment process.

FIG. 18 illustrates a flowchart for an example reticle adjustment process. The example process 1800 may be performed by one or more components of the wearable system 200 such as, e.g., the remote processing module 270 or the local processing and data module 260, alone or in combination. The display 220 of the wearable system 200 can present reticle(s) to the user, the inward-facing imaging system 462 can obtain the eye images for eye gaze determination, and IMUS, accelerometers, or gyroscopes can determine head pose.

At block 1810, similar to block 1740 of FIG. 17, the wearable system calculates an angular difference between a head pose vector and a neutral head pose vector.

At block 1820, the wearable system determines whether the angular difference satisfies or fails to satisfy a minimum head pitch threshold. As described herein, head pitch may correspond to tilting the head forward or backward. Accordingly, the angular difference may fail to satisfy a minimum head pitch threshold when the user is straining or bending his or her neck forward (e.g., to look at the ground). For example, the minimum head pitch threshold may correspond to an angular difference of about −30, −35, −40, −45, −50, 55, or −60 degrees (+/−a few degrees). Thus, in some cases, if the angular difference is at or below the minimum head pitch threshold, the angular difference fails to satisfy the minimum head pitch threshold. However, in some cases, the angular difference satisfies the minimum head pitch threshold if it is at or below the minimum head pitch threshold.

It should be noted that if the angle between the head pose vector and the neutral head pose vector (e.g., head pose vector minus neutral head pose vector) is positive, then the user is looking up relative to a neutral position. Likewise, if the angle is negative, the user is looking down. Accordingly, in some cases, the system can determine if the user is looking up or down, and can take an absolute value of the angular difference to ensure a positive angle. In some embodiments, the system can determine an angular difference (e.g., head pose vector minus neutral head pose vector) and will understand that a negative value indicates that the user is looking down.

At block 1830, the wearable system determined that the angular difference does not satisfy the minimum head pitch threshold. As such, the wearable system determines an adjusted reticle position using an angle adjustment associated with the minimum head pitch threshold. In some cases, the angle adjustment can be about −30, −25, −20, −15, −12, −10, −5, or −2 degrees.

At block 1840, the wearable system determines whether the angular difference satisfies or fails to satisfy a maximum head pitch threshold. As described herein, head pitch may correspond to tilting the head forward or backward. Accordingly, the angular difference may satisfy a maximum head pitch threshold when the user is straining or bending his or her neck backward (e.g., to look at the sky). For example, the maximum head pitch threshold may correspond to an angular difference of about 2, 5, 8, 10, 12, 15, 20, 25, or 30 degrees (+/−a few degrees). Thus, in some cases, if the angular difference is at or above the maximum head pitch threshold, the angular difference satisfies the maximum head pitch threshold. However, in some cases, the angular difference fails to satisfy the maximum head pitch threshold if it is at or above the maximum head pitch threshold.

At block 1850, the wearable system determined that the angular difference satisfies the maximum head pitch threshold. As such, the wearable system determines an adjusted reticle position using an angle adjustment associated with the maximum head pitch threshold. In some cases, the angle adjustment can be about 1, 2, 3, 4, 5, 6, 7, 8, 9, 10, 12, 15, or 20 degrees.

At block 1860, the wearable system determines whether the angular difference satisfies or fails to satisfy a neutral head pitch threshold. As described herein, head pitch may correspond to tilting the head forward or backward. The neutral head pitch threshold may correspond to a natural resting state of the head. For example, the neutral head pitch threshold may correspond to an angular difference of about −10, −15, −20, −25, or −30 degrees (+/−a few degrees). Thus, in some cases, if the angular difference is at or above the neutral head pitch threshold, the angular difference satisfies the neutral head pitch threshold. Similarly, if the angular difference is below the neutral head pitch threshold, the angular difference may not satisfy the neutral head pitch threshold. However, in some cases, the angular difference fails to satisfy the neutral head pitch threshold if it is at or above the neutral head pitch threshold and may satisfy the neutral head pitch threshold it is below the neutral head pitch threshold.

At block 1870, the wearable system determined that the angular difference satisfies the neutral head pitch threshold. As such, the wearable system may adjust an angle or position of the reticle using equation 2 above.

At block 1880, the wearable system determined that the angular difference does not satisfy the neutral head pitch threshold. As such, the wearable system may adjust an angle or position of the reticle using equation 1 above.

The various blocks described herein can be implemented in a variety of orders, and that the wearable system can implement one or more of the blocks concurrently and/or change the order, as desired. Fewer, more, or different blocks can be used as part of the process 1800. For example, the process 1800 can include blocks for determining additional thresholds, providing an indication that the position of the reticle was updated, etc.

Furthermore, although process 1800 has been logically associated with preventing or reducing a likelihood of neck strain, similar techniques can be utilized to prevent or reduce a likelihood of eye strain. For example, the system can obtain eye gaze data and from the eye gaze data can determine an eye gaze vector and a neutral eye gaze vector. The system can further determine an angular difference between the eye gaze vector and the neutral eye gaze vector and, based on the angular difference and one or more thresholds, can determine an adjustment for at least one of a position of the virtual reticle or a 3D view of the display.

Example Software Code

Appendix A includes an example of code in the C# programming language that calculates head pose and vertical pitch adjustment. The code implements an example of the reticle adjustment process 1700 described with reference to FIG. 17. Appendix A is hereby incorporated by reference herein in its entirety so as to form a part of this specification.

Additional Aspects

In a first aspect, a system comprising: a head pose sensor configured to obtain head pose data of a user of the system; non-transitory memory configured to store the head pose data; a display configured to be positioned in front of an eye of a user, the display configured to project a virtual reticle toward the eye of the user; a hardware processor in communication with the head pose sensor, the display, and the non-transitory memory, the hardware processor programmed to: obtain the head pose data of the user; identify a head pose of the user based at least in part on the head pose data; determine an adjustment for a position of the virtual reticle based at least in part on a comparison between the head pose of the user and a reference head pose, and cause the virtual reticle to change in position based at least in part on the determined adjustment.

In a second aspect, the system of aspect 1, wherein the virtual reticle comprises a movable indicator identifying a position of the user within in a field of view of the user.

In a third aspect, the system of aspect 1 or aspect 2, wherein head pose data corresponds to at least one of an indication of a yaw, a pitch, or a roll of a head of the user.

In a fourth aspect, the system of aspect 3, wherein the indication of a yaw, pitch, or roll is with respect to the reference head pose.

In a fifth aspect, the system of aspect 4, wherein the reference head pose corresponds to a level head pose of the head of the user.

In a sixth aspect, the system of aspect 5, wherein the level head pose comprises a head pose in which a coronal plane of the head of the user, a sagittal plane of the head of the user, and an axial plane of the head of the user are each orthogonal to one another.

In a seventh aspect, the system of any one of aspects 1 to 6, wherein the reference head pose comprises a head pose corresponding to a natural resting state of the head of the user.

In an eighth aspect, the system of aspect 7, wherein the natural resting state of the head of the user corresponds to between −5 to 5 degrees of yaw, between −5 to 5 degrees of roll, and between −15 to −25 degrees of pitch, relative to the level head pose.

In a ninth aspect, the system of aspect 8, wherein the reference head pose corresponds to at least one of 0 degrees of yaw, 0 degrees of roll, or −20 degrees of pitch, relative to the level head pose.

In a tenth aspect, the system of any one of aspects 1 to 9, wherein the hardware processor is further programmed to identify a head pose vector corresponding to the head pose of the user and identify a reference head pose vector corresponding to the reference head pose.

In an 11th aspect, the system of aspect 10, wherein the hardware processor is further programmed to determine an angular difference between the head pose vector and the reference head pose vector based at least in part on the comparison between the head pose of the user and the reference head pose, wherein the angular difference corresponds to at least one of a difference in yaw, pitch, or roll of the head pose of the user with respect to the reference head pose.

In a 12th aspect, the system of aspect 11, wherein to determine the adjustment for the position of the virtual reticle, the hardware processor is programmed to compare the determined angular difference to one or more head pose thresholds.

In a 13th aspect, the system of aspect 12, wherein the one or more head pose thresholds comprises at least one of a maximum head pose threshold or a minimum head pose threshold.

In a 14th aspect, the system of aspect 13, wherein the maximum head pose threshold corresponds to at least one of a maximum head yaw threshold, a maximum head roll threshold, or a maximum head pitch threshold.

In a 15th aspect, the system of aspect 14, wherein the maximum head yaw threshold is 50 degrees, the maximum head roll threshold is 20 degrees, or the maximum head pitch threshold is 5 degrees, relative to the reference head pose.

In a 16th aspect, the system of any one of aspects 13 to 15, wherein the minimum head pose threshold corresponds to at least one of a minimum head yaw threshold, a minimum head roll threshold, or a minimum head pitch threshold.

In a 17th aspect, the system of aspect 16, wherein the minimum head yaw threshold is −50 degrees, the minimum head roll threshold is −20 degrees, or the minimum head pitch threshold is −45 degrees, relative to the reference head pose.

In an 18th aspect, the system of any one of aspects 13 to 17, wherein the hardware processor is further programmed to: responsive to a determination that the angular difference fails to satisfy the minimum head pose threshold, determine the adjustment for the position of the virtual reticle based at least in part on a first adjustment value.

In a 19th aspect, the system of aspect 18, wherein the first adjustment value is about −12 degrees.

In a 20th aspect, the system of any one of aspects 13 to 19, wherein the hardware processor is further programmed to, responsive to a determination that the angular difference satisfies the maximum head pose threshold, determine the adjustment for the position of the virtual reticle based at least in part on a second adjustment value.

In a 21st aspect, the system of aspect 20, wherein the second adjustment value is about +5 degrees.

In a 22nd aspect, the system of any one of aspects 13 to 21, wherein the hardware processor is further programmed to: responsive to a determination that the angular difference satisfies the minimum head pose threshold and fails to satisfy the maximum head pose threshold, determine the adjustment for the position of the virtual reticle based at least in part on a third adjustment value.

In a 23rd aspect, the system of aspect 22, wherein the third adjustment value corresponds to an easing function.

In a 24th aspect, the system of aspect 22 or aspect 23, wherein the third adjustment value is about 0 degrees.

In a 25th aspect, the system of any one of aspects 1 to 24, wherein to cause the virtual reticle to change in position comprises causing the virtual reticle to change position from a default reticle position of a field of view of the user.

In a 26th aspect, the system of aspect 25, wherein the default reticle position comprises a center of a field of view of the user.

In a 27th aspect, the system of any one of aspects 1 to 26, wherein the head pose sensor comprises an inertial measurement unit (IMU), an accelerometer, a gyroscope, or a magnetometer.

In a 28th aspect, the system of any one of aspects 1 to 27, wherein the wearable system comprises a head mounted wearable system.

In a 29th aspect, a method of adjusting a position of a virtual reticle identifying a position of a user within a field of view corresponding to a display of a display system, the method comprising: obtaining head pose data of a user of a display system from a head pose sensor configured to track a head pose of the user; identifying a head pose vector corresponding to the head pose of the user based at least in part on the head pose data; identifying a reference head pose vector corresponding to a reference head pose; determining an angular difference between the head pose vector and the reference head pose vector based at least in part on a comparison between the head pose of the user and the reference head pose, wherein the angular difference corresponds to at least one of a difference in yaw, pitch, or roll of the head pose of the user with respect to the reference head pose; comparing the determined angular difference to one or more head pose thresholds, wherein the one or more head pose thresholds comprises at least one of a maximum head pose threshold or a minimum head pose threshold; responsive to a determination that the angular difference fails to satisfy the minimum head pose threshold, determining an adjustment for a position of a virtual reticle based at least in part on a first adjustment value, wherein the position of the virtual reticle corresponds to a position of the movable indicator identifying the position of the user within the field of view of the user; responsive to a determination that the angular difference satisfies the maximum head pose threshold, determining the adjustment for the position of the virtual reticle based at least in part on a second adjustment value; responsive to a determination that the angular difference satisfies the minimum head pose threshold and fails to satisfy the maximum head pose threshold, determining the adjustment for the position of the virtual reticle based at least in part on a third adjustment value; and causing the position of the virtual reticle to be adjusted from a default reticle position of the field of view of the user based on the determined adjustment. The method can be performed under control of the display system, for example, by a hardware processor programmed to perform the operations of the method.

In a 30th aspect, the method of aspect 29, wherein the virtual reticle comprises a movable indicator identifying the position of the user within the field of view of the user.

In a 31st aspect, the method of aspect 29 or aspect 30, wherein head pose data corresponds to at least one of an indication of yaw, pitch, or roll of the head of the user.

In a 32nd aspect, the method of aspect 31, wherein the indication of yaw, pitch, or roll of the head of the user is with respect to the reference head pose.

In a 33rd aspect, the method of any one of aspects 29 to 32, wherein the reference head pose of the user corresponds to a level head pose of the head of the user.

In a 34th aspect, the method of aspect 33, wherein the level head pose comprises a head pose in which a coronal plane of the head of the user, a sagittal plane of the head of the user, and an axial plane of the head of the user are each orthogonal to one another.

In a 35th aspect, the method of any one of aspects 29 to 34, wherein the reference head pose comprises a head pose corresponding to the head of the user in a natural resting state.

In a 36th aspect, the method of aspect 35, wherein the natural resting state of the user's head corresponds to about −5 to 5 degrees of yaw, about −5 to 5 degrees of roll, or about −15 to −25 degrees of pitch, relative to a level head of the user.

In a 37th aspect, the method of aspect 35 or aspect 36, wherein the reference head pose corresponds to at least one of 0 degrees of yaw, 0 degree of roll, or −20 degrees of pitch, relative to the level head pose.

In a 38th aspect, the method of any one of aspects 29 to 37, wherein the maximum head pose threshold corresponds to at least one of a maximum head yaw threshold, a maximum head roll threshold, or a maximum head pitch threshold.

In a 39th aspect, the method of any one of aspects 29 to 38, wherein the maximum head yaw threshold is about 50 degrees, the maximum head roll threshold is about 20 degrees, and the maximum head pitch threshold is about 5 degrees, relative to the reference head pose.

In a 40th aspect, the method of any one of aspects 29 to 39, wherein the minimum head pose threshold corresponds to at least one of a minimum head yaw threshold, a minimum head roll threshold, or a minimum head pitch threshold.

In a 41st aspect, the method of any one of aspects 29 to 40, wherein the minimum head yaw threshold is about −50 degrees, the minimum head roll threshold is about −20 degrees, and the minimum head pitch threshold is about −45 degrees, relative to the reference head pose.

In a 42nd aspect, the method of any one of aspects 29 to 41, wherein the first adjustment value is about −12 degrees.

In a 43rd aspect, the method of any one of aspects 29 to 42, wherein the second adjustment value is about +5 degrees.

In a 44th aspect, the method of any one of aspects 29 to 43, wherein the third adjustment value corresponds to an easing function.

In a 45th aspect, the method of any one of aspects 29 to 44, wherein the third adjustment value is about 0 degrees.

In a 46th aspect, the method of any one of aspects 29 to 45, wherein the default reticle position comprises the center of the user's field of view.

In a 47th aspect, the method of any one of aspects 29 to 46, wherein the head pose sensor comprises an inertial measurement unit (IMU), an accelerometer, a gyroscope, or a magnetometer.

In a 48th aspect, a method of adjusting a position of a virtual reticle identifying a position of the user within a field of view corresponding to a display of a display system, the method comprising: obtaining head pose data of the user of the display system; identifying a head pose based at least in part on the head pose data; identifying a reference head pose; determining, based at least in part on a comparison between the head pose and the reference head pose, an adjustment for a position of a virtual reticle projected on a head mounted display.

In a 49th aspect, the method of aspect 48, further comprising obtaining the head pose data of the user of the display system from a head pose sensor configured to track a head pose of the user.

In a 50th aspect, the method of aspect 48 or aspect 49, further comprising: identifying a head pose vector corresponding to the head pose of the user; and identifying a reference head pose vector corresponding to the reference head pose.

In a 51st aspect, the method of any of aspect 50, further comprising: determining an angular difference between the head pose vector and the reference head pose vector based at least in part on the comparison between the head pose and the reference head pose, wherein the angular difference corresponds to at least one of a difference in yaw, pitch, or roll of the head pose of the user with respect to the reference head pose.

In a 52nd aspect, the method of any one of aspects 48 to 51, wherein said determining the adjustment for the position of the virtual reticle is further based on a comparison of the angular difference to one or more head pose thresholds.

In a 53rd aspect, the method of aspect 52, wherein the one or more head pose thresholds comprises at least one of a maximum head pose threshold or a minimum head pose threshold.

In a 54th aspect, a method of adjusting a position of a movable indicator identifying a position of the user within a field of view of the user with respect to a display of a display system, the method comprising: identifying at least one of a max head pitch threshold, a min head pitch threshold, or a neutral head pitch threshold; identifying a head pose vector corresponding to a head pose of a user; identifying a reference head pose vector; calculating an angular difference between the head pose vector and the reference head pose vector; calculating a reticle adjustment based at least in part on the angular difference and at least one of the max head pitch threshold, the min head pitch threshold, or the neutral head pitch threshold; and determining, based at least in part on the calculated reticle adjustment, an adjusted reticle position.

In a 55th aspect, the method of aspect 54, further comprising obtaining head pose data of the user of the display system from a head pose sensor configured to track a head pose of the user.

In a 56th aspect, the method of aspect 54 or aspect 55, wherein said determining the angular difference is based at least in part on a comparison between the head pose vector and the reference head pose vector, wherein the angular difference corresponds to at least one of a difference in yaw, pitch, or roll of the head pose of the user with respect to the reference head pose.

In a 57th aspect, the method of any one of aspects 54 to 56, wherein said determining the adjusted reticle position is further based on a comparison of the angular difference to one or more head pose thresholds.

In a 58th aspect, the method of aspect 57, wherein the one or more head pose thresholds comprises at least one of a maximum head pose threshold or a minimum head pose threshold.

In a 59th aspect, a method of adjusting a position of a virtual reticle identifying a position of a user within a field of view corresponding to a display of a display system, the method comprising: calculating an angular difference between a head pose vector and a reference head pose vector, wherein the head pose vector corresponds to a head pose of a user of a display system, and wherein the reference head pose vector corresponds to a reference head pose; determining that the angular difference does not satisfy a minimum head pitch threshold; and determining an adjusted reticle position based at least in part on an angle adjustment associated with the min head pitch threshold.

In a 60th aspect, the method of aspect 59, further comprising: obtaining head pose data of the user of the display system from a head pose sensor configured to track a head pose of the user; identifying the head pose vector corresponding to a head pose of the user based at least in part on the head pose data; and identifying the reference head pose vector corresponding to the reference head pose.

In a 61st aspect, the method of aspect 59 or aspect 60, wherein said calculating the angular difference is based at least in part on a comparison between the head pose vector and the reference head pose vector, wherein the angular difference corresponds to at least one of a difference in yaw, pitch, or roll of the head pose of the user with respect to the reference head pose.

In a 62nd aspect, a method of adjusting a position of a virtual reticle identifying a position of a user within a field of view corresponding to a display of a display system, the method comprising: calculating an angular difference between a head pose vector and a reference head pose vector, wherein the head pose vector corresponds to a head pose of a user of an display system, and wherein the reference head pose vector corresponds to a reference head pose; determining that the angular difference satisfies a minimum head pitch threshold; determining that the angular difference does not satisfy a maximum head pitch threshold; and determining an adjusted reticle position based at least in part on an angle adjustment associated with the max head pitch threshold.

In a 63rd aspect, the method of aspect 62, further comprising: obtaining head pose data of the user of the display system from a head pose sensor configured to track a head pose of the user; identifying the head pose vector corresponding to a head pose of the user based at least in part on the head pose data; and identifying the reference head pose vector corresponding to the reference head pose.

In a 64th aspect, the method of aspect 62 or aspect 63, wherein said calculating the angular difference is based at least in part on a comparison between the head pose vector and the reference head pose vector, wherein the angular difference corresponds to at least one of a difference in yaw, pitch, or roll of the head pose of the user with respect to the reference head pose.

In a 65th aspect, a method of adjusting a position of a virtual reticle identifying a position of a user within a field of view corresponding to a display of a display system, the method comprising: calculating an angular difference between a head pose vector and a reference head pose vector, wherein the head pose vector corresponds to a head pose of a user of an display system, and wherein the reference head pose vector corresponds to a reference head pose; determining that the angular difference satisfies a minimum head pitch threshold; determining that the angular difference does not satisfy a neutral head pitch threshold; and determining an adjusted reticle position based at least in part on an easing function.

In a 66th aspect, the method of aspect 65, further comprising: obtaining head pose data of the user of the display system from a head pose sensor configured to track a head pose of the user; identifying the head pose vector corresponding to a head pose of the user based at least in part on the head pose data; and identifying the reference head pose vector corresponding to the reference head pose.

In a 67th aspect, the method of aspect 65, wherein said calculating the angular difference is based at least in part on a comparison between the head pose vector and the reference head pose vector, wherein the angular difference corresponds to at least one of a difference in yaw, pitch, or roll of the head pose of the user with respect to the reference head pose.

In a 68th aspect, a method of adjusting a position of a virtual reticle identifying a position of a user within a field of view corresponding to a display of a display system, the method comprising: calculating an angular difference between a head pose vector and a reference head pose vector, wherein the head pose vector corresponds to a head pose of a user of a display system, and wherein the reference head pose vector corresponds to a reference head pose; determining that the angular difference satisfies a neutral head pitch threshold; determining that the angular difference does not satisfy a maximum head pitch threshold; and determining an adjusted reticle position based at least in part on an easing function.

In a 69th aspect, the method of aspect 68, further comprising: obtaining head pose data of the user of the display system from a head pose sensor configured to track a head pose of the user; identifying the head pose vector corresponding to a head pose of the user based at least in part on the head pose data; and identifying the reference head pose vector corresponding to the reference head pose.

In a 70th aspect, the method of aspect 68 or aspect 69, wherein said calculating the angular difference is based at least in part on a comparison between the head pose vector and the reference head pose vector, wherein the angular difference corresponds to at least one of a difference in yaw, pitch, or roll of the head pose of the user with respect to the reference head pose. Any of the methods described in any of the preceding aspects can be performed under control of a hardware processor, for example, a hardware processor associated with a head-mounted display system.

In a 71st aspect, a system comprising: a head pose sensor configured to measure head pose data of a user of the system; non-transitory memory configured to store the head pose data corresponding to at least one of an indication of a yaw, pitch, or roll of the head of the user; a display configured to be positioned in front of an eye of a user, the display configured to project a virtual reticle toward the eye of the user, wherein the virtual reticle comprises a movable indicator identifying a position of the user within a field of view; a hardware processor in communication with the head pose sensor, the display, and the non-transitory memory, the hardware processor programmed to: obtain the head pose data of the user; identify a head pose vector corresponding to a head pose of the user based at least in part on the head pose data; identify a reference head pose vector corresponding to a reference head pose; determine an angular difference between the head pose vector and the reference head pose vector based at least in part on a comparison between the head pose of the user and the reference head pose, wherein the angular difference corresponds to at least one of a difference in yaw, pitch, or roll of the head pose of the user with respect to the reference head pose; compare the determined angular difference to one or more head pose thresholds, wherein the one or more head pose thresholds comprises at least one of a maximum head pose threshold or a minimum head pose threshold; responsive to a determination that the angular difference fails to satisfy the minimum head pose threshold, determine an adjustment for a position of the virtual reticle based at least in part on a first adjustment value; responsive to a determination that the angular difference satisfies the maximum head pose threshold, determine the adjustment for the position of the virtual reticle based at least in part on a second adjustment value; responsive to a determination that the angular difference satisfies the minimum head pose threshold and fails to satisfy the maximum head pose threshold, determine the adjustment for the position of the virtual reticle based at least in part on a third adjustment value; and cause the position of the virtual reticle to be adjusted from a default reticle position of the field of view of the user based on the determined adjustment.

ADDITIONAL CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

APPENDIX A

```
[Header("Pitches limits relative to horizontal")]
public float maxHeadPitch = 5;
public float neutralHeadPitch = -20;
public float minHeadPitch = -45;
[Header("Angle offsets at the min/max head pitch")]
public float maxHeadPitchDelta = 8;
public float minHeadPitchDelta = -12;
```

APPENDIX A-continued

```
public Vector3 GetAcceleratedForwardVector( ) {
// Pitch limits relative to horizontal
float maxHeadPitch = 5;
float neutralHeadPitch = -20;
float minHeadPitch = -45;
// Angle offsets at the min/max head pitch
float maxHeadPitchDelta = 8;
float minHeadPitchDelta = -12;
// Get the camera/headpose forward vector
Vector3 forward = Headpose.Forward;
// Get the forward vector projected on to the horizontal plane
Vector3 flat = forward;
flat.y = 0;
flat.Normalize ( );
// Calculate the absolute angle between the headpose forward vector and the flattened forward vector
float pitch = Mathf.Acos (Vector3.Dot (forward, flat)) * Mathf.Rad2Deg;
// If the forward vector is pointing downwards, then the angle is negative
if (forward.y < 0)
{
pitch = -pitch;
}
// pitchAdjustment is the angular deviation from the forward vector
float pitchAdjustment = 0;
if (pitch >= maxHeadPitch)
{
// If pitch > maxHeadPitch, set adjustment to maxHeadPitchDelta
pitchAdjustment = maxHeadPitchDelta;
}
else if (pitch >= neutralHeadPitch)
{
// If pitch is between neutralHeadPitch and maxHeadPitch, set adjustment to be an eased value between 0 and maxHeadPitchDelta
float t = (pitch - neutralHeadPitch) / (maxHeadPitch - neutralHeadPitch);
t = EaseOutSine(t);
pitchAdjustment = maxHeadPitchDelta * t;
}
else if (pitch >= minHeadPitch)
{
// If pitch is between neutralHeadPitch and minHeadPitch, set adjustment to be an eased value between 0 and minHeadPitchDelta
float t = (pitch - minHeadPitch) / (neutralHeadPitch - minHeadPitch);
t = EaseOutSine(1 - t);
pitchAdjustment = minHeadPitchDelta * t;
}
else
{
// If pitch < minHeadPitch, set adjustment to minHeadPitchDelta
pitchAdjustment = minHeadPitchDelta;
}
// If the pitch adjustment is not equal to zero
if (pitchAdjustment != 0)
{
// Calculate the vector perpendicular to the up and forward vectors
Vector3 right = Vector3.Cross (Vector3.up, flat);
// Calculate the rotation adjustment
Quaternion adjust = Quaternion.AngleAxis(pitchAdjustment, -right);
// Apply the adjustment to the forward vector to get a new adjusted forward vector
forward = adjust * forward;
}
return forward;
}
©MAGIC LEAP, INC. All rights reserved.
```

What is claimed is:

1. A system comprising:

a head pose sensor configured to obtain head pose data of a user of the system;

non-transitory memory configured to store the head pose data;

a display configured to be positioned in front of an eye of a user, and configured to project a virtual reticle toward the eye of the user within a field of view (FOV) of the user, wherein the FOV changes as a head pose of the user changes; and a hardware processor in communication with the head pose sensor, the display, and the non-transitory memory, the hardware processor programmed to:

identify a head pose of the user based at least in part on the head pose data; and cause the display to render the virtual reticle at a location within the FOV based at least in part on the head pose, wherein while the head pose satisfies a first head pose threshold and does not satisfy a second head pose threshold, the location of the virtual reticle within the FOV is based at least in part on an easing function and the head pose changes as the head pose changes, and wherein while the head pose does not satisfy the first head pose threshold, the FOV changes as the head pose changes and the location of the virtual reticle is fixed within the FOV.

2. The system of claim 1, wherein while the head pose satisfies the first head pose threshold and does not satisfy a second head pose threshold, the location of the virtual reticle is based at least in part on an offset and the head pose.

3. The system of claim 1, wherein the virtual reticle comprises a movable indicator identifying a position within in the FOV.

4. The system of claim 1, wherein at least one of the first head pose threshold or the second head pose threshold corresponds to at least one of −50 degrees to 50 degrees relative to an axial plane of the user, −20 degrees to 20 degrees relative to a coronal plane of the user, or −45 degrees to 5 degrees relative to a sagittal plane of the user.

5. The system of claim 1, wherein while the head pose satisfies the second head pose threshold, movement of the virtual reticle within the FOV is limited by a boundary associated with the FOV.

6. A system comprising:
a head pose sensor configured to obtain head pose data of a user of the system;
non-transitory memory configured to store the head pose data;
a display configured to be positioned in front of an eye of a user, and configured to project a virtual reticle toward the eye of the user within a field of view (FOV) of the user,
wherein the FOV changes as a head pose of the user changes; and
a hardware processor in communication with the head pose sensor, the display, and the non-transitory memory, the hardware processor programmed to:
identify a head pose of the user based at least in part on the head pose data;
based at least in part on a determination that the head pose does not satisfy a first head pose threshold, cause the display to render a virtual reticle at a fixed location within the FOV,
wherein while the head pose does not satisfy the first head pose threshold, the FOV changes as the head pose changes; and
based at least in part on a determination that the head pose satisfies the first head pose threshold and does not satisfy a second head pose threshold, cause the display to render the virtual reticle at a location within the FOV that varies based at least in part on an easing function and the head pose of the user.

7. The system of claim 6, wherein while the head pose satisfies the first head pose and does not satisfy the second head pose threshold, the location of the virtual reticle is based at least in part on an offset and the head pose.

8. The system of claim 6, wherein the fixed location corresponds to a center of the FOV.

9. The system of claim 6, wherein the virtual reticle comprises a movable indicator identifying a position within in the FOV.

10. The system of claim 6, wherein the first head pose threshold corresponds to at least one of −50 degrees to 50 degrees relative to an axial plane of the user, −20 degrees to 20 degrees relative to a coronal plane of the user, or −45 degrees to 5 degrees relative to a sagittal plane of the user.

11. The system of claim 6, wherein while the head pose satisfies the second head pose threshold, movement of the virtual reticle within the FOV is limited by a boundary associated with the FOV.

12. A method of adjusting a position of a virtual reticle identifying a position within a field of view (FOV) corresponding to a display of a display system, the method comprising:
identify a head pose of a user based at least in part on head pose data obtained from a head pose sensor;
based at least in part on a determination that the head pose does not satisfy a first head pose threshold, cause the display to render a virtual reticle at a fixed location within the FOV,
wherein while the head pose does not satisfy the first head pose threshold, the FOV changes as the head pose changes; and
based at least in part on a determination that the head pose satisfies the first head pose threshold and does not satisfy a second head pose threshold, cause the display to render the virtual reticle at a location within the FOV that varies based at least in part on an easing function and the head pose of the user.

13. The method of claim 12, wherein while the head pose satisfies the first head pose and does not satisfy the second head pose threshold, the location of the virtual reticle is based at least in part on an offset and the head pose.

14. The method of claim 12, wherein the default location corresponds to a center of the FOV.

15. The method of claim 12, wherein the virtual reticle comprises a movable indicator identifying a position within in the FOV.

16. The method of claim 12,
wherein the first head pose threshold corresponds to at least one of −50 degrees to 50 degrees relative to an axial plane of the user, −20 degrees to 20 degrees relative to a coronal plane of the user, or −45 degrees to 5 degrees relative to a sagittal plane of the user.

17. The method of claim 12, wherein while the head pose satisfies the second head pose threshold, movement of the virtual reticle within the FOV is limited by a boundary associated with the FOV.

* * * * *